United States Patent
Phansalkar et al.

(10) Patent No.: US 10,574,766 B2
(45) Date of Patent: Feb. 25, 2020

(54) CLICKSTREAM ANALYSIS METHODS AND SYSTEMS RELATED TO DETERMINING ACTIONABLE INSIGHTS RELATING TO A PATH TO PURCHASE

(71) Applicant: comScore, Inc., Reston, VA (US)

(72) Inventors: Amit Phansalkar, Newton, MA (US); Anna Zaozerskaya, Cambridge, MA (US); Christopher J. Mahoney, Brighton, MA (US); Margaret Hung, New York, NY (US)

(73) Assignee: Comscore, Inc., Reston, VA (US)

( * ) Notice: Subject to any disclaimer, the term of this patent is extended or adjusted under 35 U.S.C. 154(b) by 329 days.

(21) Appl. No.: 14/310,372

(22) Filed: Jun. 20, 2014

(65) Prior Publication Data

US 2014/0379428 A1    Dec. 25, 2014

Related U.S. Application Data

(60) Provisional application No. 61/838,061, filed on Jun. 21, 2013.

(51) Int. Cl.
*H04L 29/08* (2006.01)
(52) U.S. Cl.
CPC .................. *H04L 67/22* (2013.01)
(58) Field of Classification Search
CPC ............... G06Q 30/02; G06Q 30/0202; G06Q 30/0601; H04L 29/06
See application file for complete search history.

(56) References Cited

U.S. PATENT DOCUMENTS

| | | | | |
|---|---|---|---|---|
| 8,332,271 B1* | 12/2012 | Wilder | ............... | G06Q 30/0201 705/16 |
| 2001/0014868 A1* | 8/2001 | Herz | .................. | G06Q 10/0637 705/14.38 |
| 2002/0120528 A1* | 8/2002 | Hutten | ................... | G06Q 30/02 705/14.53 |
| 2007/0055937 A1* | 3/2007 | Cancel | .................. | G06Q 30/00 715/704 |
| 2007/0266033 A1* | 11/2007 | Kelly | ..................... | G06Q 30/02 |
| 2008/0183718 A1* | 7/2008 | Singh | ..................... | G06Q 20/20 |
| 2008/0189281 A1* | 8/2008 | Cancel | .................... | G06Q 30/02 |
| 2008/0259155 A1* | 10/2008 | McLelland | ............ | H04N 7/147 348/14.03 |
| 2011/0112897 A1* | 5/2011 | Tietzen | .................. | G06Q 30/02 705/14.25 |
| 2013/0332264 A1* | 12/2013 | Chittilappilly | ......... | G06Q 30/02 705/14.45 |

* cited by examiner

*Primary Examiner* — Kurtis Gills
*Assistant Examiner* — Akosua Kyereme-Tuah
(74) *Attorney, Agent, or Firm* — Baker & Hostetler LLP

(57) ABSTRACT

Methods and systems are provided herein for collecting web browser click events across a plurality of web sites from a data collection agent (DCA), as a click-stream, at a data collection server (DCS) to record and provide user on-line activity, filtering the user online activity to include activity from a time period prior to a sale from the sales transaction data and identifying one or more shopping touch-points based on the filtered user online activity and the sales transaction data. Further, an engagement index, an influence index, and an opportunity index is calculated. A digital touch-points facility may perform the identifying and calculating.

26 Claims, 23 Drawing Sheets

2400

CLICKSTREAM ANALYSIS METHODS AND SYSTEMS RELATED TO DETERMINING ACTIONABLE INSIGHTS RELATING TO A PATH TO PURCHASE

CROSS-REFERENCE TO RELATED APPLICATIONS

This application claims the benefit of the following provisional application, which is hereby incorporated by reference in its entirety: U.S. Provisional Application 61/838,061, filed Jun. 21, 2013.

BACKGROUND

The advent of the Internet and the Worldwide Web has produced a host of electronic commerce applications, in which users interact with content and engage in a wide variety of transactions, ranging from ordering books, CDs and other items, to participating in auctions, to downloading music, to a host of other activities. Methods and systems are widely used for tracking the behavior of online users, both individually and as groups. The output from those methods and systems are typically used to adjust the structure and content of online offerings to help attract more users, or to get current users to engage in more interaction and more transactions with the provider.

Methods and systems for analyzing online user behavior range from statistical techniques, such as collaborative filtering, to use of neural nets and similar facilities. While such methods have had some success, the promise of electronic commerce remains somewhat unfulfilled. Many online businesses have failed, and those remaining find the environment increasingly competitive. Meanwhile, many businesses find that online offerings (including their own), merely take business away from offline product offerings, or that the online offerings harm offline offerings in other ways, such as by forcing price reductions. Thus, methods and systems are needed for providing improved coordination between online and offline offerings. In addition, methods and systems are needed for allowing offline businesses to take advantage of information that can be discerned from online customer behavior.

SUMMARY

Methods and systems are provided herein for the analysis of behavior of online users. The analysis methods and systems allow for the creation of new offline business methods based on online consumer behavior.

Methods and systems are also provided for providing a host computer for handling a plurality of processes, the host system having a collection facility, a network, a pre-calculation facility, a calculation facility, and a post-calculation facility; obtaining an input data set of online user data from a plurality of data providers, wherein the input data set represents HTTP transactions of a plurality of online users; and sending an output data set to a co-location facility to permit remote access by a party other than the host.

The calculation facility may comprise providing a cluster of machines distributed in a parallel processing configuration. Output data may be stored in a data warehouse or sent to a collocation facility.

Methods and systems are also provided for obtaining an input data set from a plurality of data providers, the data set comprising data representing HTTP transactions for a plurality of users; performing a pre-calculation process to produce a file in a file format suitable for performing calculations; performing calculations on the formatted file; and performing post-calculation on the results of the calculations to produce an output file.

Methods and systems are further provided for transferring the output file to at least one of a co-location facility and a data warehouse.

Methods and systems are also provided for collecting the data set for analysis by a host computer; delivering the data set to an internal network; and performing an integrity check on the data.

Methods and systems are also provided wherein the formatted file comprises data selected from the group consisting of a file identifier, a user identifier for a user who completed an HTTP transaction, a data provider identifier for the data provider who provided the data representing the HTTP transaction, a timestamp for the HTTP transaction, a URL for the HTTP transaction, and a protocol identifier for the protocol of the transaction.

The pre-calculation step may include reading a list of URL rules; for each character of the URL of a formatted file, walking the character of the URL through the URL rules; for each rule in the URL rules, applying the rule to the URL of the formatted file; and outputting a modified URL, the modified URL reflecting the application of the rules to the original URL. The modified URL may be appended to a modified formatted file.

The methods and systems may further comprise providing a panel selection process for selecting a panel of users, data for which will be used in an input data set. The process may include conducting a survey of user demographics for an initial user panel; determining a statistic related to the demographics of the users in the user panel; comparing the statistics to the statistics for a past user panel; selecting a new panel of users representing a desired set of demographic characteristics; and determining whether to keep or discard a data item based on membership of a user in the panel.

The URL of the output file may include a session identifier, a domain identifier, a subdomain identifier, a path and a query string.

The output file may further include a hash, such as hash of the domain identifier, the subdomain identifier, or the path.

The methods and systems described herein may include calculating a metric based on the data in the output file. The metric may be a vertical market metric calculation, a search term metric calculation, or other metric.

The metric calculation may be a vertical market metric calculation that can include using a page extractor module for extracting data identifying a page of online content; using a fetcher module to retrieve the page content from a computer network; and using a classifier module to classify the page in at least one content category selected from a group of possible content categories.

Metrics may be calculated using a cluster of machines configured in a parallel-processing configuration or batch-processing configuration.

In embodiments, an input URL is decomposed based on semantic meaning of the pages viewed by the user who executes the HTTP transaction. The decomposition process may be made in the presence of redirection from a primary URL to a secondary URL or in the presence of a proxy URL for a second URL.

Methods and systems may also include obtaining an input data set reflecting clickstream activity of a plurality of online users; analyzing user behavior reflected by the clickstream activity; drawing an inference based on the user behavior; and modifying an offline process based on the inference.

The inference may relate to cross-shopping behavior between different goods and the offline process may be a marketing promotion. The input data may relate to price sensitivity of a shopper and the offline process may be a pricing process for an offline item. The input data may relate to ordering of a user's views of items and the offline process may relate to merchandizing and to product placement to promote viewing goods in a particular order. The input date may relate to user buying interest or share of interest and the offline process may relate to forecasting offline demand for a product. The input data may relate to actions of users with respect to online content choices and the offline process may relate to presenting offline media content.

In embodiments the methods and systems may include obtaining a set of data reflecting online actions of a plurality of users; analyzing the data to identify characteristics of the user's behavior; and modifying an off-line business process based on the identified characteristics.

In embodiments, a method includes providing a data collection agent (DCA) that records web browser click events across a plurality of web sites, transmits a clickstream of the web browser click events to a data collection server (DCS) that resides on a computer, the DCA embodied as a web browser plug-in on a user client station, receiving the web browser click events from the DCA, as a clickstream, at the DCS to record and provide user online activity, surveying a user to collect sales transaction data, filtering the user online activity to include activity from a time period prior to a sale from the sales transaction data, and identifying, using a digital touch-points facility, one or more shopping touch-points based on the filtered user online activity and the sales transaction data. The method further includes calculating an engagement index based on the percent of total shoppers interacting with the specific touch-point, and the intensity of those interactions, including time and number of repeat visits as determined from the user online activity, wherein the engagement index represents the extent of actual shopper engagement with touch-points. The method further includes calculating an influence index, wherein the influence index represents the probability of one touch-point interaction influencing a shopper's final action. The method further includes calculating an opportunity index, wherein the opportunity index shows the competitive view of touch-point interactions. Click events occur on at least one of a computer, a tablet, and a mobile device. In embodiments calculating an engagement index, an intensity, and/or an influence index may including evaluating a series of touch-points, or a series of alternative paths among or through touch-points, thereby examining the path a customer may take to arrive at a decision point, such as a purchase. The sales transaction data may include one or more of a date of transaction, a time of transaction, a method of payment, a type of good(s) or service(s) transacted, and a merchant, however, many other types of sales transaction data may be collected.

In an embodiment, a method includes collecting sales transaction data from a third party, collecting web browser click events across a plurality of web sites using a data collection agent (DCA), the DCA embodied as a web browser plug-in on a user client station, transmitting a click-stream of the web browser click events to a data collection server (DCS) that resides on a computer to record and provide user online activity, matching the sales transaction data to the user online activity, filtering the user online activity to include activity from a time period prior to a sale from the sales transaction data, and identifying, using a digital touch-points facility, one or more shopping touch-points based on the filtered user online activity and the sales transaction data. The click events occur on at least one of a computer, a tablet, and a mobile device. The data are matched by at least one of address, name, phone number, email address, credit card number. The method further includes calculating an engagement index based on the percent of total shoppers interacting with the specific touch-point, and the intensity of those interactions, including time and number of repeat visits as determined from the user online activity, wherein the engagement index represents the extent of actual shopper engagement with touch-points. The method further includes calculating an influence index, wherein the influence index represents the probability of one touch-point interaction influencing a shopper's final action. The method further includes calculating an opportunity index, wherein the opportunity index shows the competitive view of touch-point interactions. The sales transaction data may include one or more of a date of transaction, a time of transaction, a method of payment, a type of good(s) or service(s) transacted, and a merchant, however, many other types of sales transaction data may be collected. The method may further include calculating at least one of an influence index, an opportunity index and an engagement index for a combination of touch-points. The method may further include calculating at least one of an influence index, an opportunity index and an engagement index for a path representing navigation among at least a plurality of touch-points.

DETAILED DESCRIPTION

Figure 1:
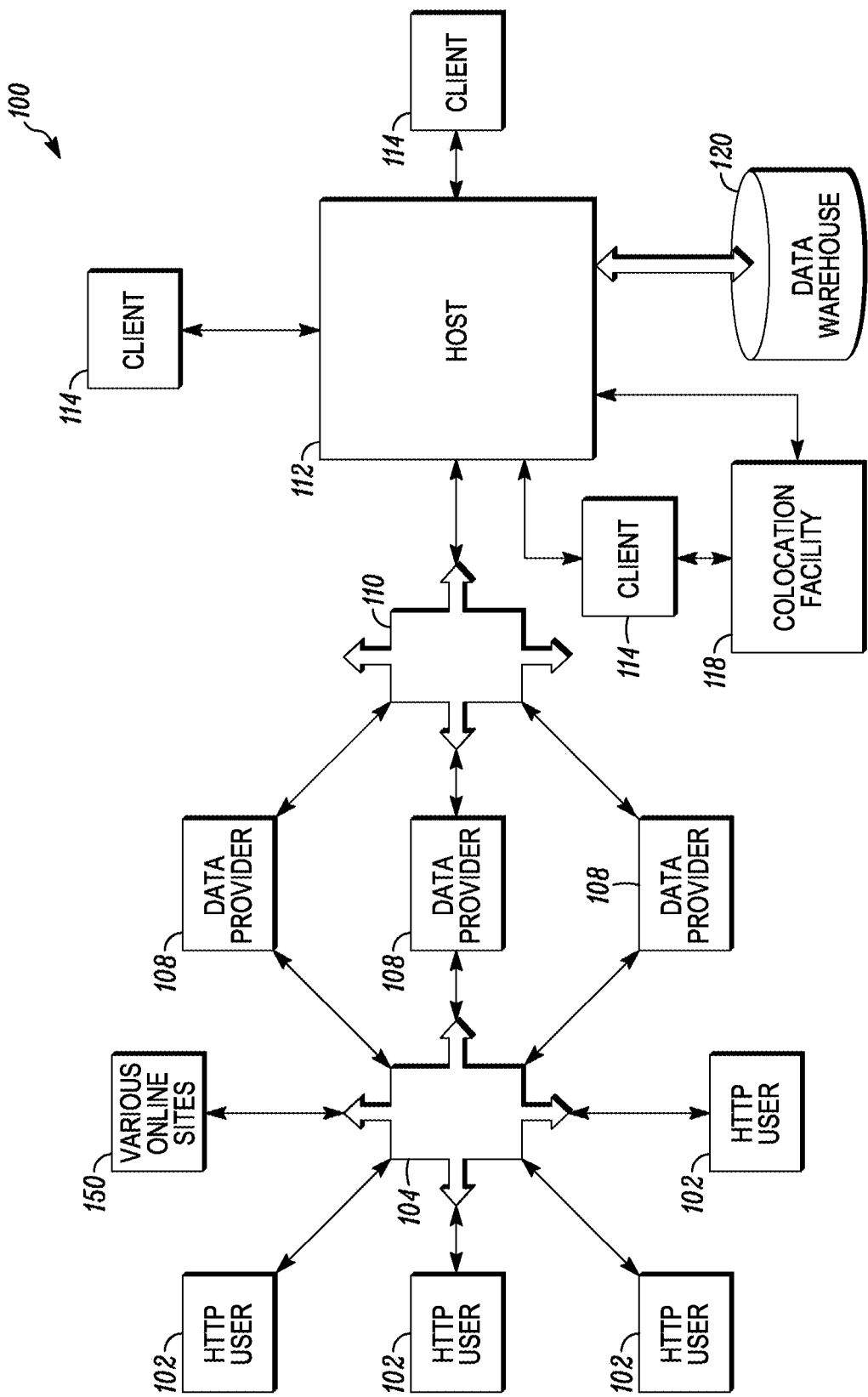
FIG. 1 is a schematic diagram showing high-level entities that interact in the methods and systems disclosed herein.

Referring to FIG. 1, a schematic diagram 100 shows high-level entities that participate in various embodiments of methods and systems disclosed herein. The methods and systems are facilitated by a host 112, which may have a host computer system for facilitating various processes and functions described below. The host may have a plurality of clients 114 who interact with the host to obtain information, analysis, or a variety of services. In some cases the clients 114 obtain information from the host 112 through a separate facility, such as a co-location facility 118. The host 112 operates on data that it receives through a plurality of data providers 108. The data from the data providers 108 is typically sent to the host over a computer network 110, such as the Internet, or through any other conventional communications facility. The host 112 may store data in a data facility 120, such as a data warehouse. The data providers 108 may each have one or more data centers, which may consist of conventional facilities for storing data relating to use of online services. The data providers 108 may thus run a plurality of servers, which may be configured as server farms. The data providers 108 may be Internet Service providers, ecommerce companies, content providers, media companies, or other companies that collect data regarding user interactions online. The data providers typically obtain their data from the interaction of various users 102 who trigger HTTP transactions as they engage in online behavior with various online sites 150. The users 102 interact with their computers, webTVs, PDAs or other communications-enabled devices, through a communication facility 104, which may represent the Internet, Worldwide Web, or other wired or wireless computer network. Those interactions are tracked and stored by the data provider 108, and some of them are passed along to the host 112 for analysis on behalf of various clients 114.

Referring still to FIG. 1, the online behavior of a user 102 is typically reflected in a series of HTTP (HyperText Transfer Protocol) transactions, HTTPS transactions. These transactions can represent HTML pages or any of a wide variety of other content. The transactions are typically made from a user's browser (such as an Internet Explorer or Netscape Navigator browser), but HTTP transactions can be made from other applications as well. The browser or other application can reside on any computer, such as a laptop, personal computer, server, personal digital assistant, WebTV, or other device.

The user 102 connects to online content sources by the communication facility 104, such as the Internet. The online content sources typically comprise one or more servers, which may be HTTP servers. In HTTP transactions, the servers serve content over the network in response to messages from the user's computer.

In their online behavior, users can interact with sites of one or more vendors through the data provider 108. Those data providers 108 typically track users' interactions with their sites through logs or similar facilities. The logs record user behavior, tracking what pages of content they have viewed in what sequence and for what amounts of time. Thus, either at the desktop or at the server farm, information is being tracked about every HTTP transaction that the individual executes at any time. When information is tracked at a server farm it is usually subject to an agreement between the user and a host (such as an ISP or other site host). The agreement typically sets out the conditions under which the host can share data with third parties, including demographic data about the user and data about the user's actions. A facility is then put in place at the data provider 108 to follow rules that allow capturing of users' transactions and sending some individuals data while not doing so for others.

Data about user actions can be logged in real time or collected and sent in batches by the various data providers 108. The users 102 visiting the various online sites 150 in turn serve as data sources to data providers 108 and/or for a host 112 of the methods and systems described herein.

Data is conveyed from the data providers 108 to the host 112 periodically. In some cases it is pushed from the data provider 108 to the host 112, while in others it is pulled by the host 112 from the data provider 108. The transfer is typically over a network 110, such as the Internet. The information that gets pulled or pushed across is typically HTTP/HTTPS information for each of the users 102 of that data provider 108, along with demographic information for each of those users 102.

Figure 2:
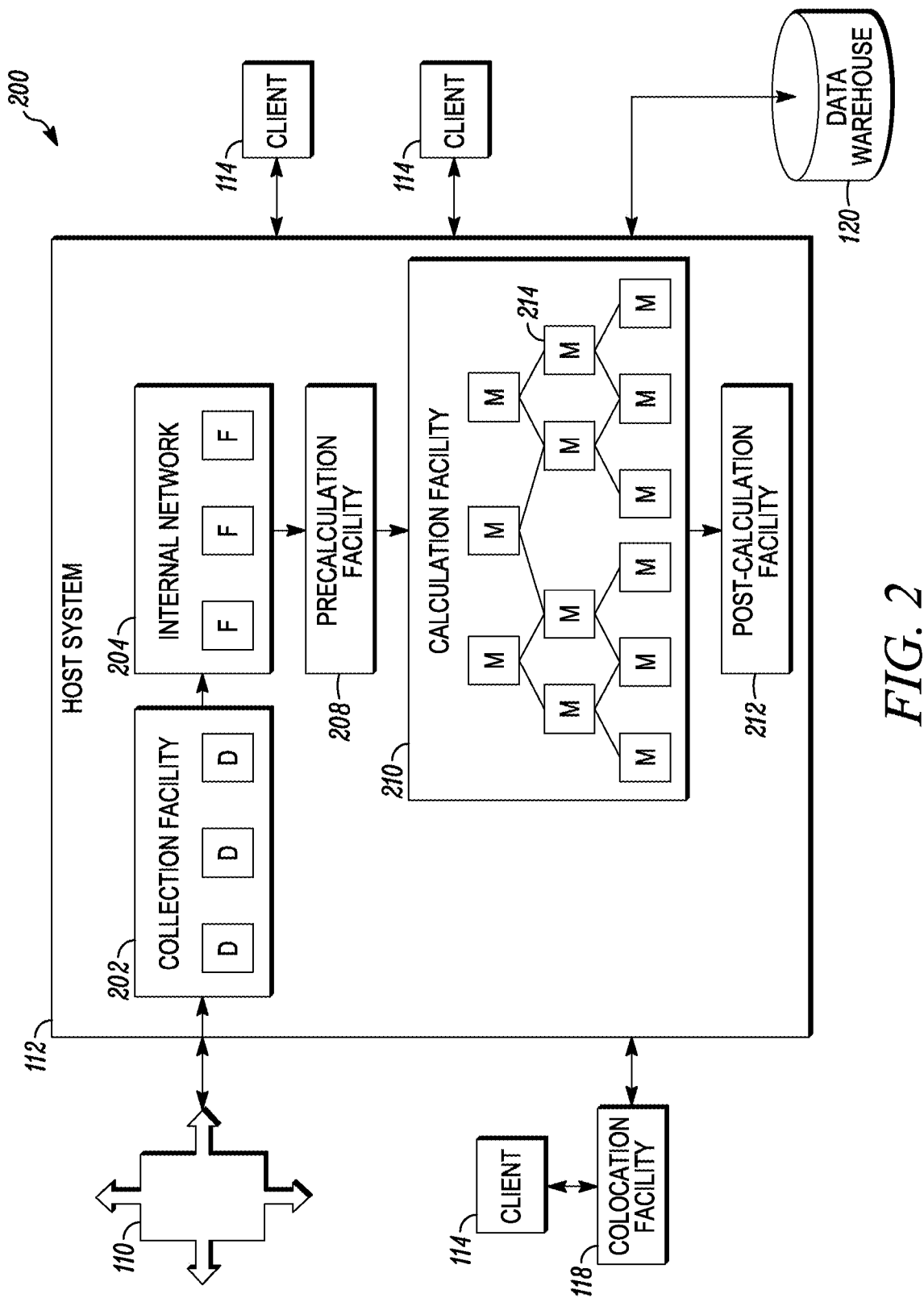
FIG. 2 is a schematic diagram showing further details of a host system of the methods and systems disclosed herein.

Referring to FIG. 2, a schematic diagram shows certain components of a host system 200. Through a series of processes and modules, the host system 200 takes data from data providers 108 and converts it into information suitable for a client 114. Inside the host system 200 a collection facility 202 collects the data from the various data providers 108. The collection facility 202 can comprise a set of machines that look at rules that are generated by the host 112 for the data provider 108 in question. Thus, the host system 200 expects data of a given format from a given data provider 108. The host system 200 can have a timing facility that generates alerts if the data from a given data provider 108 doesn't arrive on time.

Once the data has come across the network from the data provider 108, the host system 200 looks at individual files. Each data provider 108 follows a convention for the files they send over, which may contain demographic information, clickstream data, and a file signature for all files the data providers send over. To ensure that all of the data was properly transmitted, it is desirable to use a facility such as an MD5 hash of the file. If the size of the file does not match, then the host 112 can determine that the file was not properly transferred.

In embodiments, the host system 200 can comprise a plurality of Free BSD X86 Intel machines, running software written in an object-oriented language such as C++. Referring still to FIG. 2, the host system 200 may also include an internal network 204 that can handle files that come from the collection facility 202. The host system 200 may also include a pre-calculation facility, which may consist of software modules for handling certain operations that are necessary to generate a suitable form of file for handling by the host system 200. The host system 200 may also include a calculation facility 210, which may consist of software modules and a cluster 214 of machines for running a large number of parallel calculations on the files that are obtained from the pre-calculation facility 208. The calculations generate various information, such as metrics that relate to various characteristics of the behavior of users 102. The host system 200 may further include a post-calculation facility 212, which performs certain post-calculation operations on the information generated in the calculation process. Data files can be sent directly to the client 114, hosted as an ASP model, sent to a co-location facility 118, or to a data warehouse or facility 120. Further details of the various modules, machines and facilities of the host system 200 are disclosed below.

Figure 3:
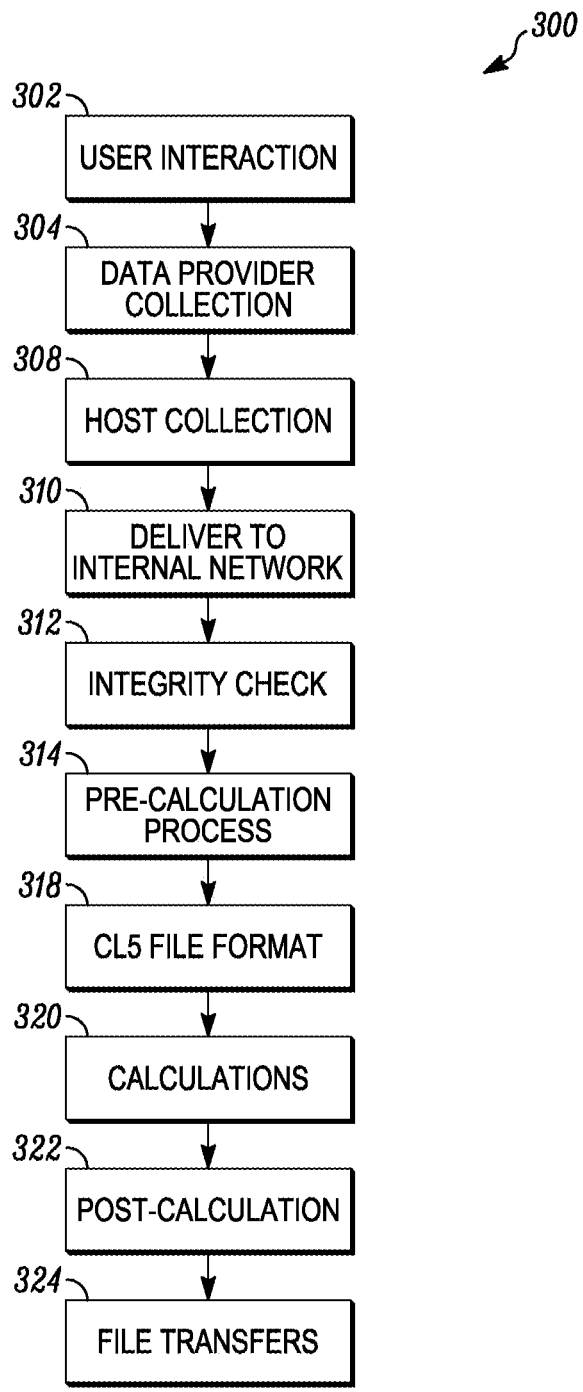
FIG. 3 is a flow diagram showing high-level process steps for an embodiment of the methods and systems disclosed herein.

Referring to FIG. 3, a flow diagram 300 depicts high-level steps for a flow of information from a user 102 through the host 112 to a client 114. First, at a step 302, the user engages in an HTTP transaction or other online interaction, such as by using a browser to interact with an e-commerce website. Next, at a step 304, a data provider 108 tracks and stores information about the actions of the user 102, such as in a log file or any of a wide range of similar facilities. The information is stored in a data center or similar facility of the data provider 108. Next, at a step 308, the host 112 collects data from the data provider 108, either by having the information pushed from the data provider 108, or by pulling the information from the data provider 108. Once the data is collected, at a step 310 the host system 200 delivers it to an internal network. Then at a step 312 the host system 200 checks the data for integrity and alerts the data provider 108 if there is a problem.

Once the integrity of the data is confirmed at the step 312, at a step 314 the pre-calculation facility of the host system 200 performs various operations needed to get data from multiple data providers into a common file format, which can be called CLF. Pre-calculation involves various sub-processes disclosed in connection with FIG. 5 and other figures below. At a step 318 the system takes the results of the pre-calculation process, a file in a standard format, and moves the files to the calculation facility 210. At a step 320 the calculation facility calculates various metrics on the files, as desired by the operator, such as for the benefit of a given client 114 or all clients 114.

After the calculation processes of the step 320 are complete, the system executes various post-calculation processes 322, typically involving merging, sorting and de-duplicating results that were obtained by multiple machines into a coherent set of files. Then the system 200 transfers the files at a step 324, such as to a data facility 120, to the client 114, or to a co-location facility. Further details of these processes are disclosed below.

Figure 4:
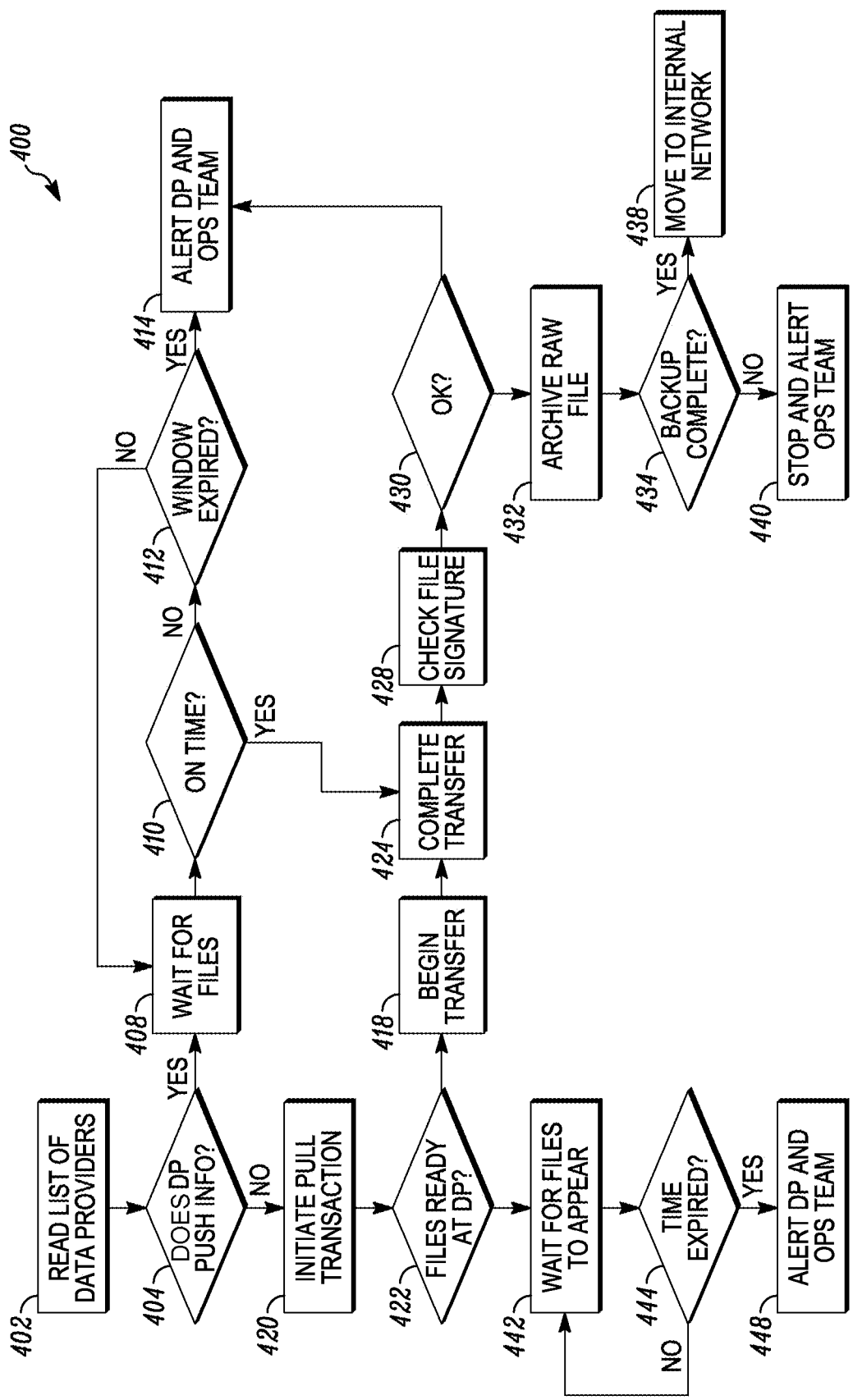
FIG. 4 is a flow diagram depicting steps of a pre-calculation process.

Referring to FIG. 4, a flow diagram 400 sets out a series of steps for an embodiment of a collection process. First, at a step 402, the system reads a list of data providers. Next, at a step 404 the system assesses for a particular data provider whether the data provider pushes information. If so, then at a step 408 the system waits for the files from the data provider. Then at a step 410 a timing facility of the system determines whether the files have arrived on time. If not, the system determines at a step 412 whether the window of time has expired for the arrival of files from that data provider. If so, then at a step 414 the system sends an alert to an operator of the host system or other individual. If at the step 412 the window has not expired, then processing returns to the step 408 to wait for the files. If at the step 410 the files are on time, then the processing is handed to step 424 to confirm completion of the transfer.

If at the step 404 it is determined that the data provider does not push information, then at a step 420 the system initiates a pull transaction with the data provider. The system then determines at a step 422 whether the files are ready at the data provider. If at the step 422 the files are ready at the data provider, then the system begins the transfer at a step 418. Processing is then sent to a step 424 until transfer is complete. Once transfer is complete (whether the data provider pushes information or the information was pulled by the host), then, at a step 428 the system checks the file signature to confirm that the files were not corrupted during transfer. If the file signature is determined at a step 430 to be okay, then at a step 432 the raw file data is archived. If the file signature is not okay at the step 430, then at the step 414 the operations team and the data provider are alerted that the file needs to be transferred again. Once the data is archived at the step 432, it is determined at a step 434 whether the archiving is complete. If archiving is complete at the step 434, then at a step 438 the files are moved for further processing, such as to an internal network of the host. If there is a problem with the archiving process, then an alert is sent to the operations team at a step 440.

If at the step 422 the files are not ready at the data provider, then at a step 442 the host system waits for a period of time and checks again. A timing facility then determines at a step 444 whether time has expired. If not, then the system continues to wait at the step 442. If so, then at a step 448 an alert is sent to the data provider and the operations team that the desired files were not ready for transfer.

In normal operation the files will transfer properly (in either a push or pull transaction), and the system will arrive at the step 438 with files ready for processing on the internal systems of the host.

Once files are ready for processing, the host system can initiate a pre-calculation process. High level steps of a pre-calculation process are depicted in a flow diagram 500 of FIG. 5. The pre-calculation process has four main high level steps. The first is a conversion process 502, which converts the files of a plurality of data providers into a common file format. Off-page connector A connects the flow diagram 500 to a flow diagram 600 of FIG. 6 that includes further details of the conversion process 502. Once the files are in a common format, the files are cleansed in a cleanse process 504. The details of an embodiment of the cleanse process are set forth in a flow diagram 800 of FIG. 8, which is connected to the flow diagram 500 by off-page connector B. Once files are cleansed, the system initiates a panel selection process 508. Details of an embodiment of a panel selection process are set forth in a flow diagram 900 of FIG. 9, which is connected to the flow diagram 500 by off-page connector C. Once the panel selection process is complete, the system initiates a transformation process. Details of an embodiment of a transformation process are set forth in a flow diagram 1000 of FIG. 10, which is connected to the flow diagram 500 by off-page connector D.

Figure 6:
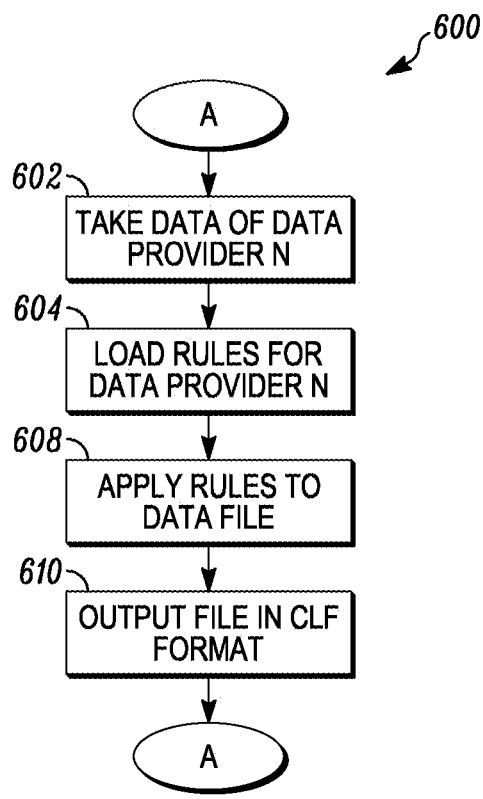
FIG. 6 is a flow diagram for a file conversion process.

Referring to FIG. 6, the files that come from multiple data providers (DPa, DPb, DPc, DPd) are input into a conversion process shown in a flow diagram 600. This is the only part of the pre-calculation process that is data-provider dependent. The conversion process of the flow diagram 600 takes information from multiple providers in different formats and is converted to a common file format for the host system. First, at a step 602, the host system takes in the data from different data providers. Next, at a step 604 the convert application (which may be embodied as an API or similar facility) loads a class that has rules specific to the data provider who provided the file in question. Next, at a step 608, the application uses the rules to read in the information from that format for each data provider. Finally, at a step 610, the system outputs the data into a standard file format for the host system. In embodiments this can be called the CLF file format.

Figure 7:
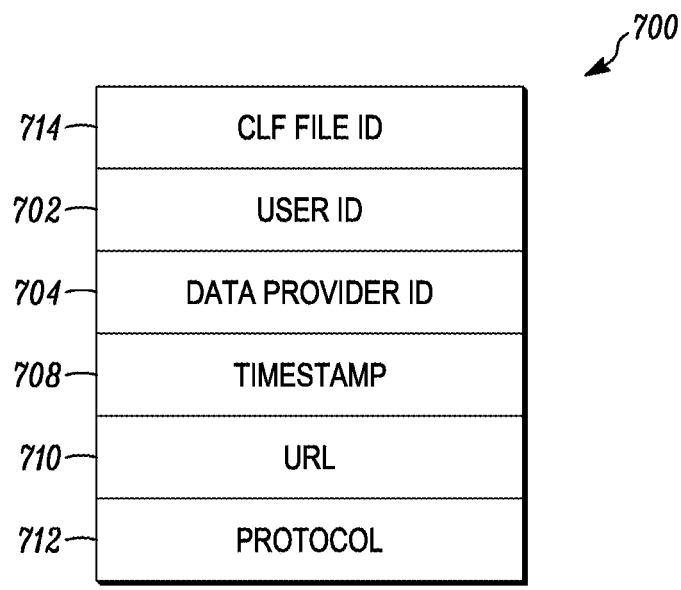
FIG. 7 is a schematic of an embodiment of a CLF file format.

FIG. 7 shows a file format 700, CLF Format, which is the standard file format for a file in an embodiment of the invention. The format 700 includes various data items, which include a file identifier 714, the identity of the user whose transactions are stored in the file, or user id 702, the identity of the data provider 704, a time stamp 708, the URL (uniform resource locator) at which the user was at the time 710, and the protocol 712 used in the transaction (e.g., HTTP, FTP, HTTPS). In embodiments the combination of the user ID 702 and the data provider ID 704 can serve as the unique file identifier 714 for the file. The file format can result in hundreds of lines for a given user's online session, with each line representing a time and URL that the user passed during the session.

Figure 8:
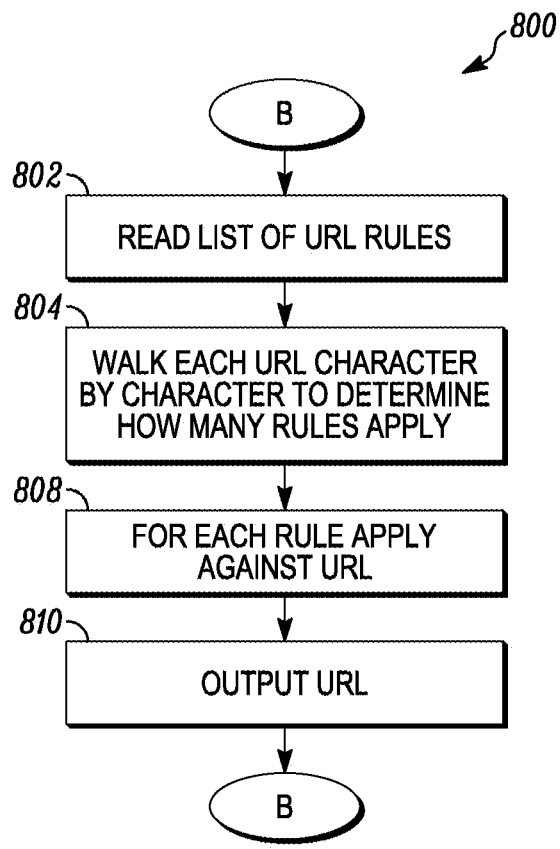
FIG. 8 is a flow diagram depicting steps for processing a URL in an embodiment of the invention.

Referring to FIG. 8, a flow diagram sets out steps for completion of a file cleansing, or cleanse, process 800. The cleanse process 800 operates on files that are in the CLF format that is generated by the conversion process 700 of FIG. 7. First, at a step 802, the system reads in a list of URL rules. Next, at a step 804, the system walks each URL character through the URL rules to determine how many rules apply to that URL. In embodiments this may occur character by character for the URL in the CLF format, using a facility such as a finite state machine. For example, if the URL were www.amazon.com, the system would look at the first character and determine how many rules apply to the first character "w" located in the first position of a URL. Then the system would determine how many rules apply to the second "w" in the second position, and so on, until all characters have been examined and a complete list of applicable rules has been loaded.

Once the system has determined how many rules apply at the step 804, then, at a step 808, the system applies each applicable rules against the URL. The rules can include filters for various data providers. In embodiments the rules may relate to URLs alone, or may relate to URL/data provider combinations. In embodiments, the rules might relate to the user as well. An example of a rule is as follows. If the data provider is, for example, Amazon.com, it is known that the company modifies its URLs (in a system that is not consistent with some URL protocols) and include session identifiers in the URLs, but not in the query string where they would normally appear for some data providers. By including session identifiers in the URLs, but not in the query string, it appears that each Amazon.com URL is from a unique provider, when in fact all of them are from Amazon.com. To avoid seeing each Amazon URL as coming from a unique provider, the system can apply a rule that pulls out the session identifier from the URL and produces an output URL that doesn't have the session identifier.

Thus, at a step 810, the system outputs a cleansed URL in accordance with the various rules.

Figure 9:
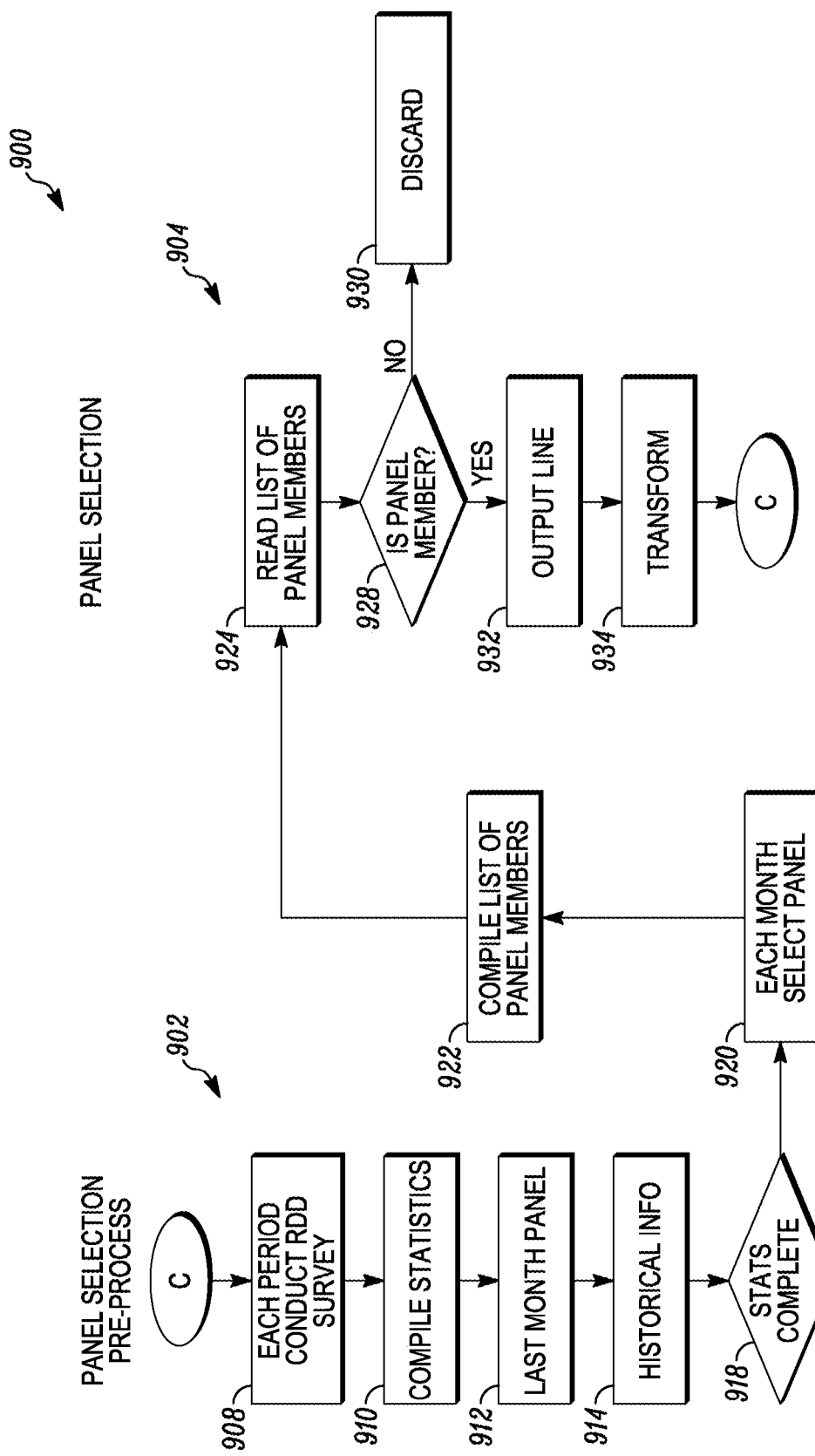
FIG. 9 is a flow diagram showing a panel selection pre-process and a panel selection process.

Referring to FIG. 9, a flow diagram 900 depicts a panel selection preprocess 902 and a panel selection process 904. In the panel selection pre-process, first, at a step 908 there is periodically (e.g., once per week or once per month) a survey conducted, such as a random digit dial (RDD) survey to determine the nature of certain characteristics of the Internet community. For example, the RDD survey determines the total number of Internet users in the United States, and it breaks down those users into categories based on age, income, gender and location (based on zip code or phone prefix). Next, in a statistical process 910, statisticians compile information from the RDD survey about age, income, activity level, where the user is online (home or work) and the like. Next, at a step 912 an operator of the host looks at the panel for the previous period and at a step 914 examines historical information about that panel of users. Next, upon completion of a statistical analysis of the previous panel and the current statistics from the RDD survey, the host selects a panel of users at a step 918. Selection is performed based on finding users with targeted combinations of various demographic information. The panel can consist of users with many different target combinations. In an embodiment, about one hundred combinations can be used with different demographic combinations. For example, one combination might be males aged 16 who are earning more than $30,000. Based on historical demographic data supplied to the host by the data providers, it is possible to generate a representative mix of users with the indicated characteristics for a wide variety of demographic combinations. At a step 922 the operator of the host can compile a list of panel members, completing the preprocess 902.

Selection of panel members is a statistical process that involves some degree of prediction. For example, selecting a panel involves guessing that a given user will be online again for the next month, so that data can be collected. If the host analyzes data less frequently (e.g., only after the end of a given month, see step 920), then the host can analyze based on actual information about what users were actually on line in that month. However, if the host wishes to deliver information more rapidly (such as weekly or daily) then it can be preferable to predict what users will be online, rather than waiting to see what users were actually online before making a panel selection.

Next, at a step 924 the system reads the list of panel members generated at the step 922. For a given data file in the CLF format, at a step 928 the panel selection process reads the file line by line and determines whether the user identified by the user id 702 is a panel member. If not, then at a step 930 the system discards the file. If at the step 928 the user id 702 is for a panel member, then at a step 932 the system outputs the file and sends it at a step 934 to the transformation process depicted further in the flow diagram 1000 of FIG. 10.

Figure 10:
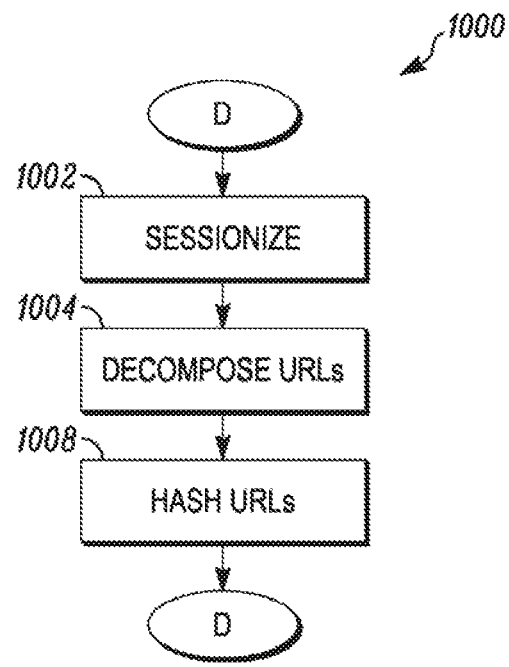
FIG. 10 is a flow diagram depicting steps for a transformation process of an embodiment of the present invention.

Referring to FIG. 10, steps for a transformation process are provided in a flow diagram 1000. The transformation process 1000 reads a CLF format file line by line taking the output from the panel selection process 900 of FIG. 9. Thus, it takes output only for those files that are for panel members.

First, at a step 1002, the system sessionizes the data for a given user. Because a user may be logged on to a site all day (or longer), it can be difficult to identify clearly delineated online sessions for the user. In order to sessionize the data, the system looks at data for a particular user for a given day and walks down all of the URLs the user clicked on, looking for inactivity greater than a given time (e.g., 30 minutes) in the timestamps. If there is inactivity greater than the predetermined time, the end of a session is marked. Session identification can be accomplished with conventional log file analysis tools.

Once a session is identified at the step 1002, the system outputs a file in CLF format with a session id added. Thus, the file now has the user ID 702, data provider ID 704, time stamp 708, URL/URLs 710 and protocol 712, as well as the new element, the session ID 1010.

Figure 11:
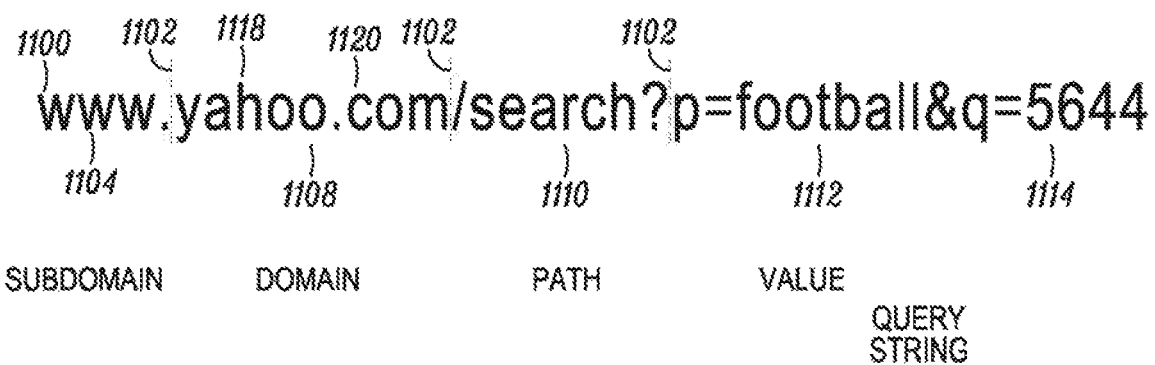
FIG. 11 depicts a breakdown of components of a typical URL.

Once the data is divided into session at the step 1002, the system decomposes the URLs in the CLF format file in a step 1004. Decomposition of a URL is accomplished by applying a complex set of rules that are based on the location of given characters at given positions in the URL. Referring to FIG. 11, a URL 1100 is divided into a plurality of sections denoted in FIG. 11 by the dividers 1102. The URL of FIG. 11 is www.yahoo.com/search?p=football&5644. As the Internet grows, and as standard bodies introduce new top level domains, it is increasingly difficult to decompose URLs into readily identifiable components. In the URL 1100, certain conventional components can be identified. First, there is a subdomain 1104, which in this case consists of a part of a domain, such as the characters "www" indicating the presence of a particular domain as being on the Worldwide Web. Next, a URL may have a domain 1108, which typically consists of a prefix 1118 (often, but not always, the name or a contraction of the name of the entity hosting the URL) and a domain type 1120 (e.g., .com for commercial entities, .net for network companies, .gov for government entities, .org for non-profit entities, a domain type reflecting a country code, or various others). The URL may also include a path 1110, which typically reflects navigation within a structure of the entity that has the domain. The URL may have a query string, which may include a structure for identifying data or content types along the indicated path. For example, the query string may include a parameter 1112 (e.g., p=) consisting of a value "football" and another parameter 1114 (e.q., q=) consisting of value "5644."

The URL 1100 is just one of many configurations of URL, and the components 1102 should be understood to be representative of one way of decomposing a URL and labeling constituent elements. Many other ways can be used. In some decompositions, for example, the path 1110, or a combination of the path 1110 and the parameters 1112 and 1114, might just be identified as a query string. In any such embodiment, the decomposition process 1004 breaks down the URL into constituent parts, based on rules that may be adjusted to reflect the URL types of a given data provider or other entity that generates URLs. The decomposition process 1004 can be accomplished in embodiments by a rule engine that steps through the characters of the URL and identifies rules that apply to the given character in the given location, as well as rules that apply to given strings of characters in given components 1102 of the URL. The rule engine essentially figures out the grammar of the URL based on a codification of the rules for all URLs in a wide range of domains.

Maintaining a rule engine that properly decomposes URLs is difficult because of the emergence of facilities such as redirection services that take a given input and redirect the user to a different URL. Thus, the rules must recognize those redirections and classify the redirecting URL as the equivalent of the target URL to which the user is redirected. In addition, many sites (Yahoo.com, for example) are now serving as proxies for other sites, thereby "swallowing" content of the other sites. Thus, if a URL such as the following is visited by a user: http://yahoo.com/proxy/http://ebay.com, the system might initially be tricked into concluding that the domain is yahoo.com. However, the real content for such a URL is actually at another domain, ebay.com. Thus, the URL analysis rules must account for the use of proxies so that they can identify particular page content as being equivalent to other page content, regardless of the use of a proxy in one case and the absence of a proxy in the other. In some situations it may be desirable to identify and store the fact that a page was found through a proxy as well as what the page was. Thus, decomposition could identify and output a file that identifies use of proxies.

The process of decomposing URLs also consists of examining page level content for each of the paths and query strings and identifying rules for what paths and query strings mean in a wide range of contexts.

Figure 12:
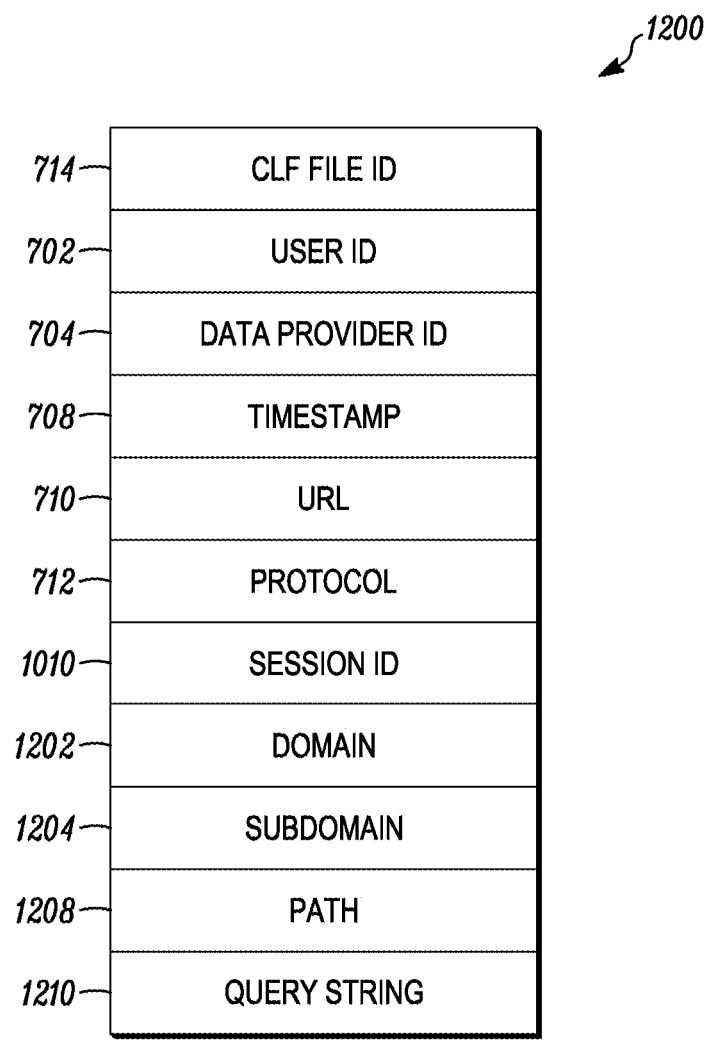
FIG. 12 depicts a file format for a file after adding information from a session identification process and a URL decomposition process.

Referring to FIG. 12, the output of the decomposition step 1004 in one embodiment is a file format 1200, including the basic CLF format with the user ID 702, data provider ID 704, time stamp 708, URL/URLs 710, protocol 712, as well as the session ID 1010, and now new elements from the decomposition step 1004, including, for example, the domain 1202, subdomain 1204, path 1208 and query string 1210.

Once a URL is decomposed at the step 1004 of FIG. 10, and the system has generated the output file in the format of FIG. 12, the system proceeds to a step 1008, at which it hashes the URLs that were decomposed at the step 1004. In an embodiment, the system takes the URLs and turns them into MD5 hashes, producing a unique hash identifier based on the character set. For each of these parts, the system generates a file that can perform as an index of URLs for later calculations.

Figure 13:
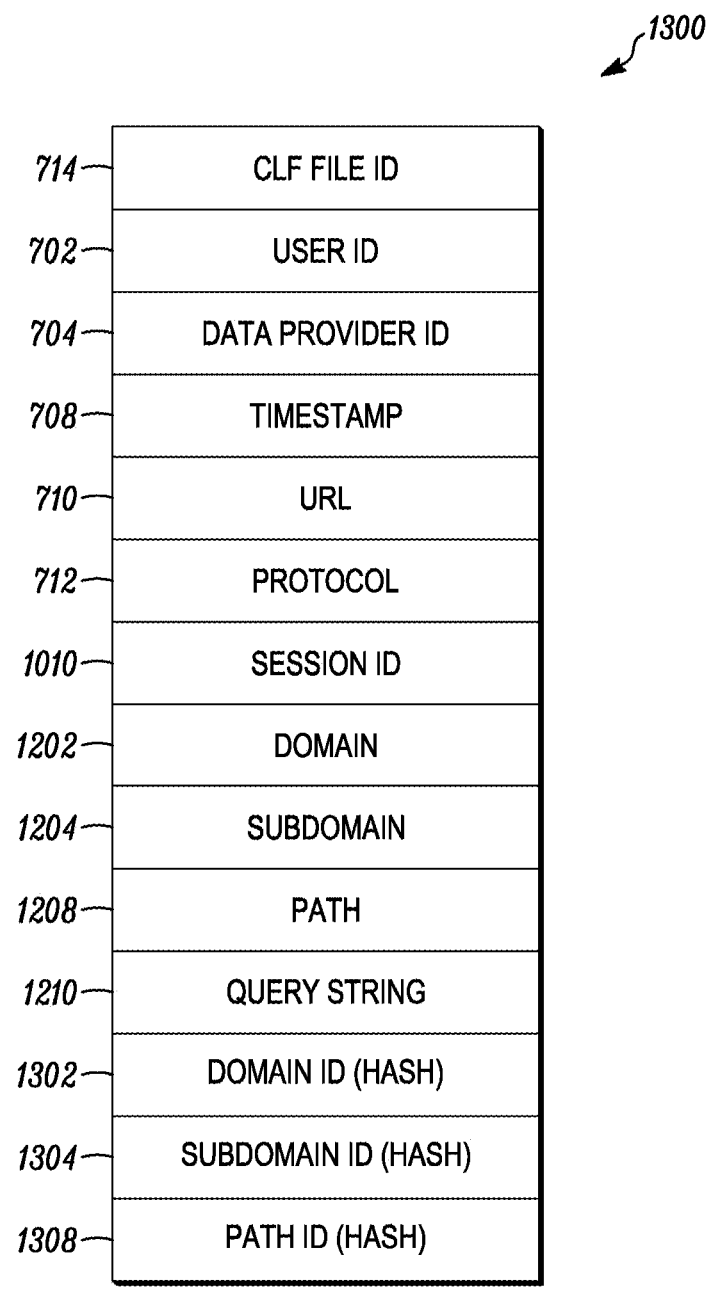
FIG. 13 depicts a CL5 file format that includes information of a common log format as well as hashes of certain data items.

The output of the hash step 1008 is a file in a format 1300 that can be called CL5, which is depicted in FIG. 13. The CL5 format consists of the elements of the decomposition step, namely, the user ID 702, data provider ID 704, time stamp 708, URL/URLs 710, protocol 712, as well as the session ID 1010, and now new elements from the decomposition step 1004, including, for example, the domain 1202, subdomain 1204, path 1208 and query string 1210, as well as new elements, including a domain ID hash 1302, a subdomain ID hash 1304 and a path ID hash 1308. Thus, the file format 1300 consists of the CLF format plus MD5 hashes (e.g., sixteen character hashes) for the last three items in the CLF format. This format is useful for future processing because, among other things, it is easier to index on a fixed number of characters.

Figure 5:
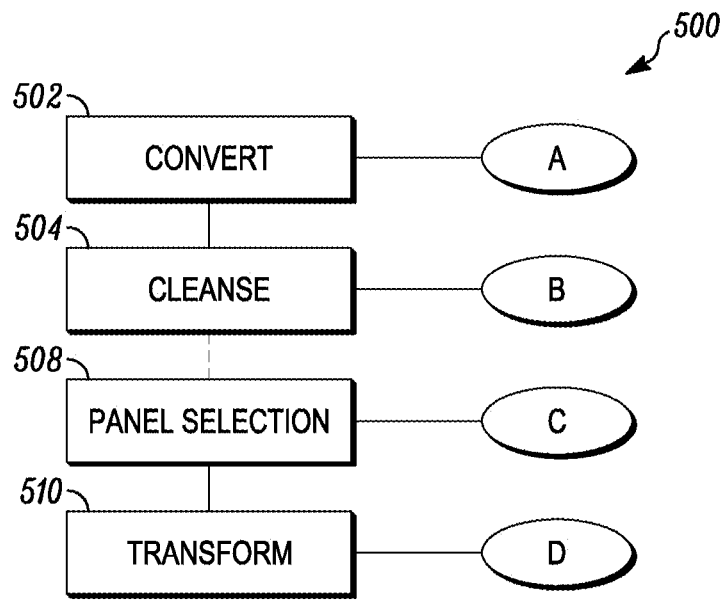
FIG. 5 is a flow diagram depicting certain high level steps of a pre-calculation process of the present invention.

Once the hash step 1008 is complete, the transformation process 510 of FIG. 5 is also complete. The net result is that the system has identified page level data and has decomposed it and indexed it based on what it means based on the content at the given URLs. Thus, the system has generated the capability of analyzing URLs based on semantic meaning.

In embodiments, the pre-calculation processes of FIG. 5, i.e., the cleanse process 504, the panel selection process 508 and the transformation process 510 operate line by line on incoming data. That is, each line goes to the cleanse process 504, then to the panel selection process 508, then to the transformation process 504, and so on.

Once a data file arrives in the system, the system checks file integrity at the step 430 of FIG. 4. Then it sends the files for the pre-calculation process of FIG. 5, applying rules across URLs and users, to produce files in a file format that can be called CLF, or compete log format in the form identified in FIG. 7, as well as files in the format of FIG. 12. At the end, the hash step 1008 of the transformation process 504 produces a file in a format that can be called CL5, or a "gold" log format, where some of the data is parsed out with one-way hashes to make lookups on those files easier. Taking URLs, breaking up into parts, and hashing parts of them allows the operator to create a pseudoindex to make it easy to look them up during the calculation process described below.

Once the pre-calculation process is complete the system can initiate a calculation process. The calculation process is designed to calculate various metrics that the operator of the host system wishes to generate out of the data provided by the data providers. Thus, the calculation process consists of many calculators, one or more for each metric that the operator wishes to calculate. The calculators can operate in parallel fashion running on clusters of machines to facilitate rapid calculation of the various metrics. Thus, in the calculation process the system ends up with multiple intermediate files running across multiple servers.

Once the calculation processes are complete, another process can be kicked off. That post-calculation process picks up the multiple files across multiple servers to merge, sort, and de-duplicate files. Essentially, the post-calculation process merges data from the various servers that performed the calculation processes.

After post-calculation processes are complete, the resulting files can be sent out to various locations, such as a co-location server, where the files may be accessed by clients of the host system, and/or to an internal data warehouse, to allow analysts of the host to look at them. Depending on how the host decides to partition a day's data there might be multiple data warehouses where files will reside. Once there, users can request data from the warehouse, which they do through a facility such as a broker (a web-based interface that takes a request, decomposes it, identifies where in the data warehouse group of machines the data resides, and returns the data to the user through the broker). In embodiments the broker may give an intermediate result or may provide a final result that is the result of the sorting, merging and de-duplicating processes. In embodiments the broker can allocate what files go on what machines and then return the files when requested by users.

More details of the calculation process are provided below. The calculation process may take place periodically, whether the period is daily, weekly, monthly or on some other time schedule. In embodiments, calculations are done daily to provide clients of the host with timely information. The calculation process can calculate many different metrics, such as the number of unique visitors to a page of content, search terms used by users, and classification of page content by industry verticals.

Figure 14:
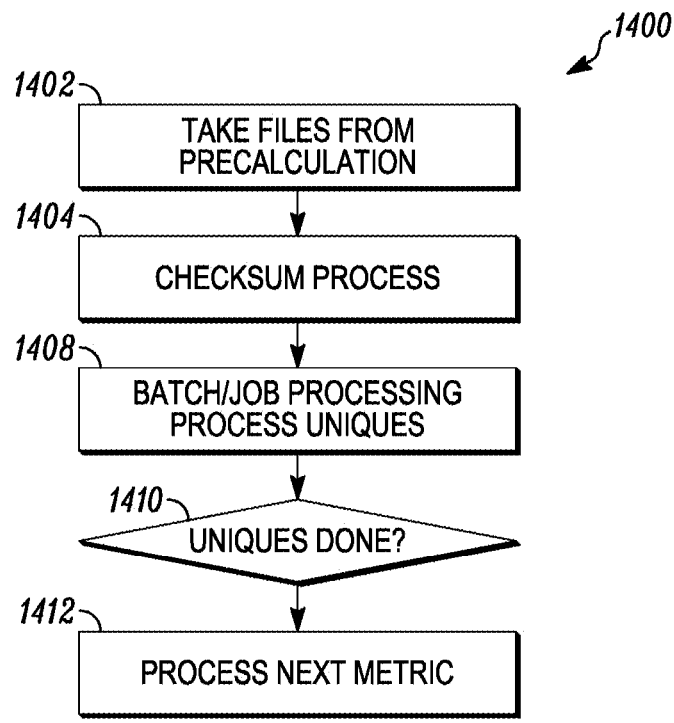
FIG. 14 is a flow diagram depicting steps for processing data for a particular metric in an embodiment of the invention.

FIG. 14 is a flow diagram 1400 showing steps for the processing of a particular metric in a calculation process. First at a step 1402, the system takes the files that come from the pre-calculation process 500 of FIG. 5, which are in a format such as the CL5 format 1300 of FIG. 13. In an embodiment, the step 1402 is accomplished by a daemon that is waiting to look for files to appear in a certain defined area. The daemon is programmed to look for the number of files that should be produced during that period (e.g., that day).

Next, at a step 1404, a checksum process happens for the daily (or other period) CL5 files to tell whether the pre-calculation process is finished writing the files out or not. When files are completed, they can be appended with a suffix, e.g., Filename.done. In the files are MD5 checksums of the files, so the system looks for the .done suffix and then compares the MD5 signature to the checksum to determine whether the files are ready to process. If the checksum works, then the system indicates so by a CHECKSUM OK message.

Next, at a step 1408, a job or batch handling facility manages a set of processing nodes to handle processing of the files. The job/batch handling facility is programmed to know which nodes are free (available for processing), which ones are busy, and which calculations can run on which nodes. (Some calculations can only run on certain nodes, while some can run on any node).

Once the handling facility hands of the processing to the nodes, the system checks periodically to determine whether the processing of a given metric is completed. For example, if the metric is the number of unique visitors to a URL, the system can at a step 1410 check to see whether the calculation of "uniques" is completed. If calculation for a metric is not complete, then processing continues. When the metric is complete at the step 1410, the system initiates processing for the next metric at a step 1412. Of course the system may calculate different metrics simultaneously, rather than completing one metric and then completing another. The flow diagram 1400 should be understood to set out the high level steps for only one embodiment of batch processing and identifying completion of a given metric calculation. Other embodiments would be readily understood by one of ordinary skill in the art.

In embodiments, each day the job processing facility knows how many work orders it has in the system. It looks up the work orders for that day. When it finds files ready to run, it begins to hand them to the nodes to run. The work orders can be conditional. Thus, they can run a given metric if the checksum is ok for the incoming file, and they can process a given metric conditioned on completion of another metric. For a work order, the job processing facility is programmed to know how many machines it needs, and it reserves the machines it needs. If processing a given metric, such as "uniques" requires four nodes, then the job processing facility can start running the calculation of uniques on four nodes, putting the other nodes on "wait" status. The job processing facility does this for each metric. The job processing facility can be programmed with a language of its own, similar to a compiler.

Figure 15:
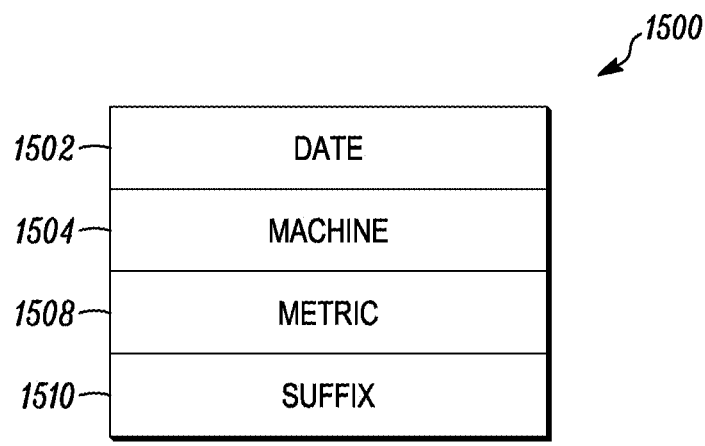
FIG. 15 is a diagram of a file format for output of a calculation process for a metric.

At a high level, the calculation process for a given metric checks to see if files are in the proper location, reserves machines needed for that metric, initiates processes on the appropriate machines, and outputs a file. Referring to FIG. 15, the file format 1500 for an output file from a machine contains various elements, including, in an embodiment, the date 1502, the machine 1504, the metric 1508 and a suffix or extension 1510.

Figure 16:
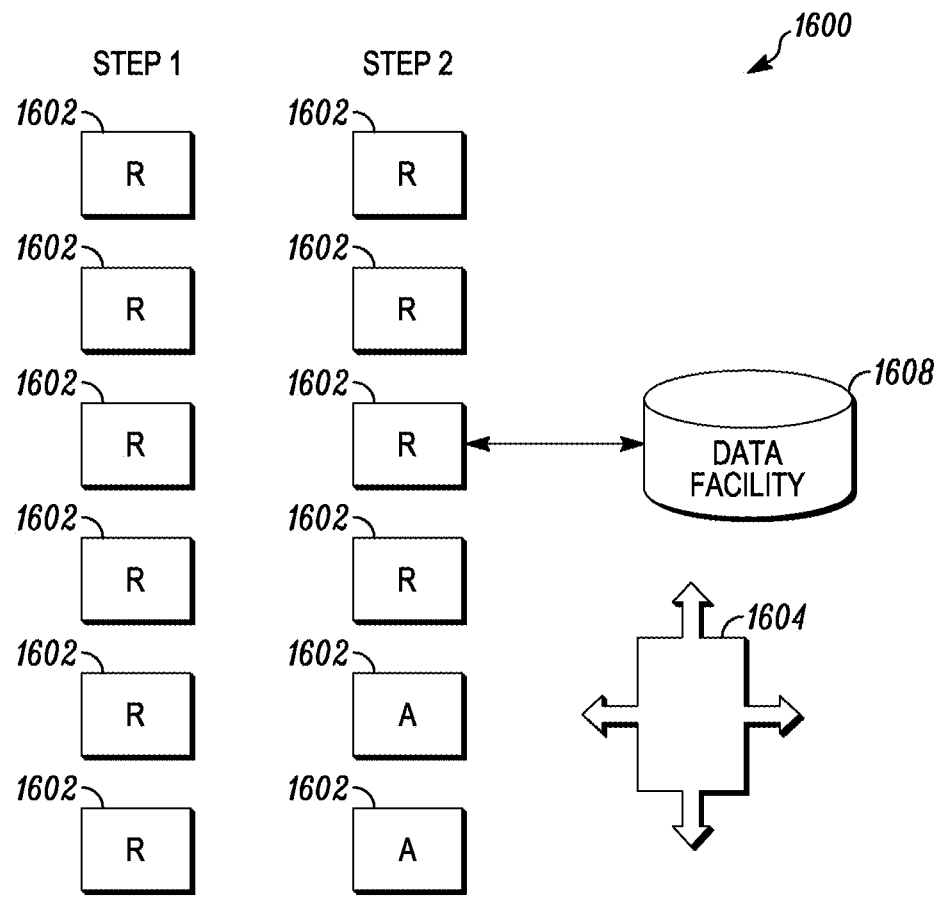
FIG. 16 is a schematic diagram depicting an array of machines for processing a metric in an embodiment of the invention.

Referring to FIG. 16, a schematic diagram 1600 shows a cluster of machines 1602 used for a calculation process. The machines can be assigned a status of "reserved", reflected by an "R" in FIG. 16 or "available", reflected by an A. Some machines 1602 may optionally be made capable of accessing an external communications facility 1604, such as the Internet, for retrieving data for use in their calculations. Other machines 1602 (or the same ones) may be made capable of accessing a data storage facility 1608, which may be an internal facility of the host system 200 or an external data storage facility. Thus, depending on the requirements of the calculation for the metric in question, the machines 1602 that run the calculation process can take advantage of external data, as well as using the files generated in the pre-calculation process.

Once the job/batch processing facility completes calculations for a given metric, a rollup process of the host system 200 can determine how many files were produced for that metric that day (or period), then combine them. For most metrics that can be accomplished by simply merging files. For some metrics, such as unique visitors, simply merging files may not be enough, because there may be a need to de-duplicate the files to avoid double counting a given user's visit to a URL.

Once the rollup process is complete the machine can produce a file (e.g., "date.unique") that contains the data for that metric for that date. In embodiments the file can be a GZIP file.

Figure 17:
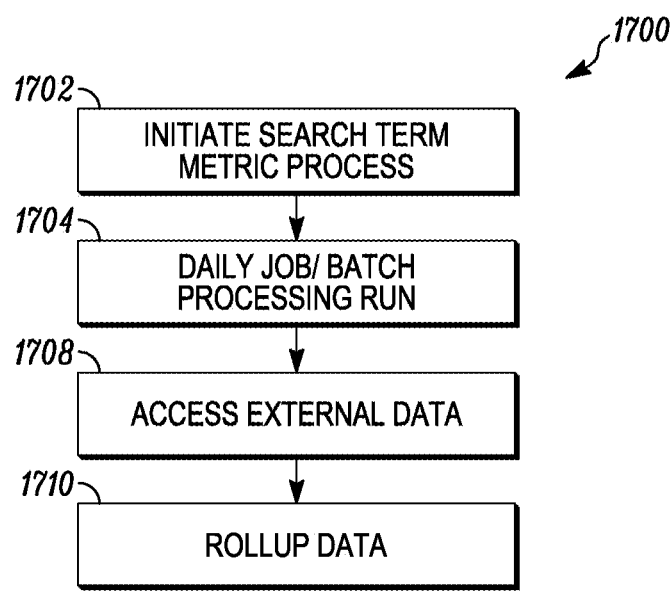
FIG. 17 is a flow diagram depicting steps for a calculation process.

Referring to FIG. 17, a flow diagram 1700 shows steps for calculating another metric, referred to herein as a "search terms" metric. In some respects the calculation of the search terms metric is similar to that for other metrics, such as the "uniques" metric discussed above. However, in other respects the search terms metric requires variation of the steps described above. First, at a step 1702, the system initiates the search term metric process (which may happen upon completion of calculations for another metric, such as uniques, thus freeing the machines that were being used to calculate uniques). At a step 1704 the calculation facility 210 of the host system initiates a daily job/batch processing run for the search terms metric. This is similar to the process described above for the calculation of the uniques metric, involving identification of the appropriate machines for the search terms metric, reserving the machines, and running the calculations on the files that came from the pre-calculation process. In the case of the search terms metric, not all data is found in the files that come from the pre-calculation process. Instead, at a step 1708 the search term calculation process accesses external data in order to complete the calculations for the search terms metric. Therefore, referring to FIG. 16, the machines 1602 used for the search terms metrics need to have the capability of accessing the external data facility 1608 in order to complete the calculations. The search terms metric calculator works not only on CL5 files from the pre-calculation process, but also on an external data set (from us or a third party). The calculator takes that information and uses it during the calculation.

In an embodiment, the external data is data from a dictionary of search terms from a multiplicity of web sites. In an embodiment, the host collects search terms from more than 27,000 sites for use by the search terms metric calculator. To know what the search pages and types are, the operator of the host system 200 or a third party goes to various sites and to sections within sites and figures out what the search URL looks like for that site. For example, for Yahoo.com the search URL might look like: search. yahoo.com? There are a wide variety of formulations for search strings. Some take the basic form of "domain.com/ p=query string," but others take different forms. For example, some sites are co-branded by two different parties. For example, if google.com and the Washington Post co-brand a site, the URL may look as follows: "Wp.google.com (parameter)p=washingtonpost.com." The dictionary of search terms must recognize this as a Washington post search string, not a google.com one. Thus, the system sets up a rule that recognizes that if the string is of the form xx.google.com/xxx? q=xxx, the credit goes to the domain identified by the query string, not to google.com.

By way of example, Yahoo.com has hundreds of search pages on their site (finance ticker, groups, mail, etc.), so the host operator can establish or access a dictionary that takes the various forms and translates them to obtain the semantic meaning, or the host can use a rule or similar facility to accomplish a similar function.

So, when the job runs at the node level, the search terms calculator reads the external data, doing lookups on tables (held in node machines in memory) to figure out who should get credit for what URL. As with rules used in pre-calculation, it is too difficult to compare each URL with all possible search terms in the dictionary. Instead, the system can pass each line a single time, and the calculators figure out whether they should calculate something with the line or throw it out.

As with the other metrics, at a step 1710 the system rolls up the files into a single file ready for transfer to the data facility 120, the client 114 or the co-location facility 118.

Figure 18:
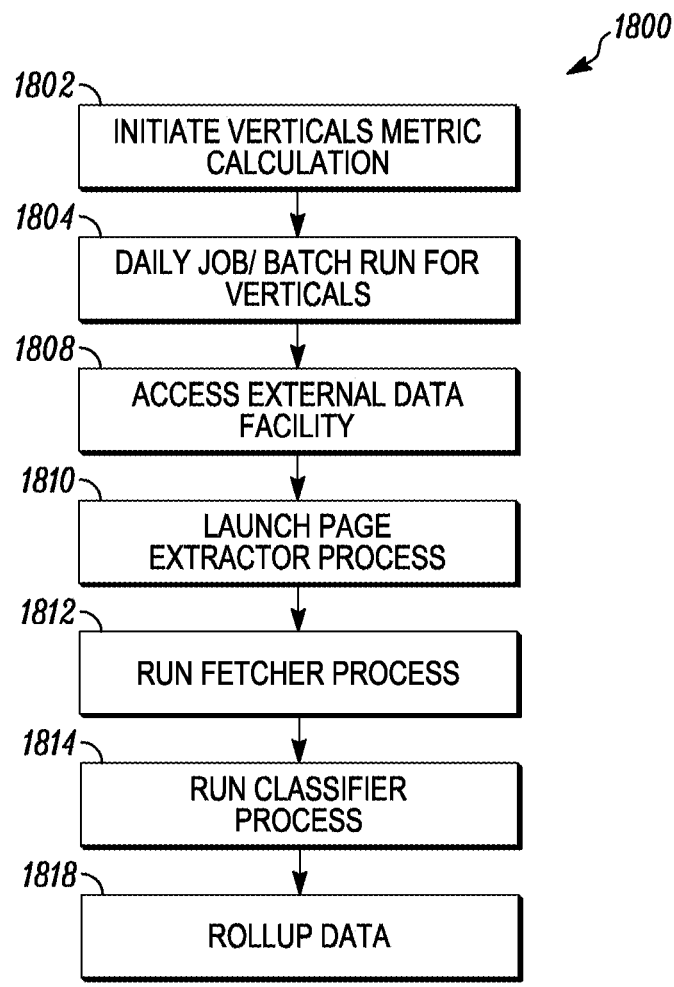
FIG. 18 is a flow diagram depicting steps for calculating a verticals metric in an embodiment of the invention.

Referring to FIG. 18, a flow diagram 1800 sets out steps for calculating another metric, called "verticals." This metric, like those described above, is done by a set of machines in the calculation facility 210 of the system 200. First, at a step 1802, the system initiates the "verticals" metric calculation. As with the other metrics, a checksum process ensures file integrity. Next, when machines become available, the calculation facility 200 reserves the appropriate machines for running the daily job/batch for the "verticals" metric calculation at a step 1804.

Next, at a step 1808, the system accesses an external communications facility. Thus, the machines used for the verticals calculation must be able to access an external communications facility, which will be used to reach an external data set. This time the system must go outside the internal network and do something in order to allow the processing.

The term "verticals" refers to industry classifications. For example, a "vertical" might be business-to-business services, with subcategories ranging from financial services, to office services, etc. Another set of verticals might be business-to-consumer services, with verticals including retail, financial services, etc. The system can classify any number of verticals.

Figure 19:
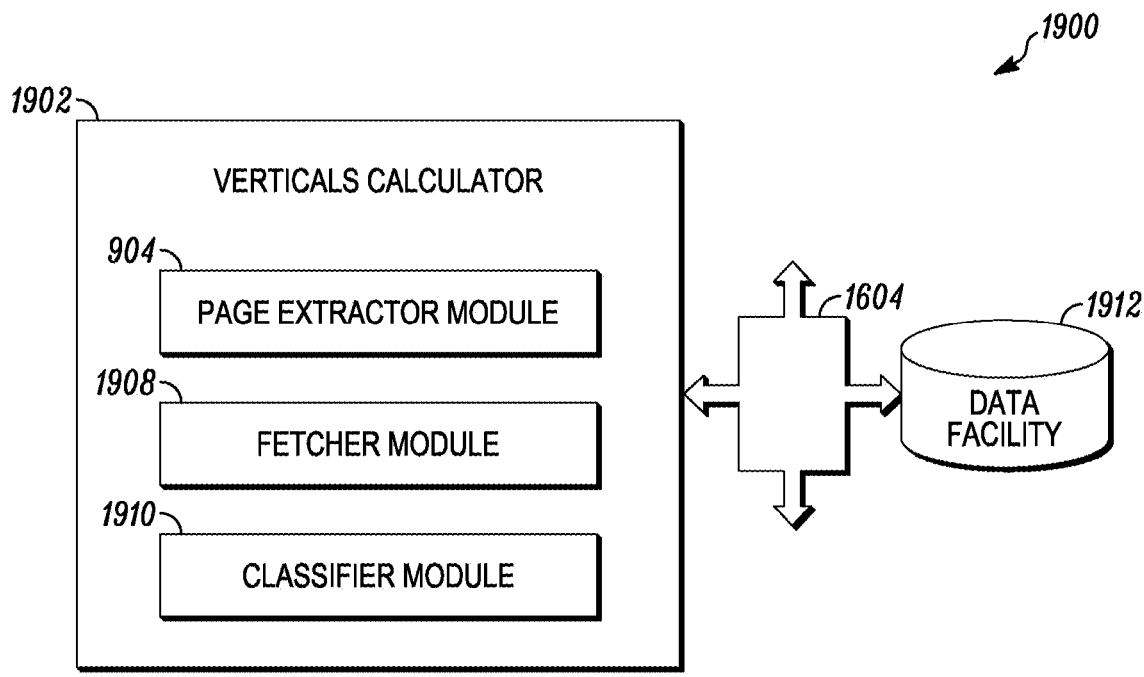
FIG. 19 is a schematic diagram showing a verticals calculator and the components for processing the verticals calculation.

Referring to FIG. 19, a schematic diagram 1900 shows a verticals calculator 1902 and three main constituent components that are used for the three main parts of the verticals calculation. The components are a page extractor module 1904, a fetcher module 1908 and a classifier module 1910. As can be seen in FIG. 19, the verticals calculation can use the external communication facility 1604 for accessing an external data facility 1912, such as to access a lexicon or set of rules stored on the facility 1912. Therefore, it is preferably run on a machine or machines that have that capability.

Referring to FIG. 18, once the external communications facility has been accessed at the step 1808, the system launches a page extractor process at a step 1810. The page extractor process reads a list of verticals stored by in the external data facility 1912, and for each vertical it launches a separate process to run for each of the sites that are classified in that vertical. For example, the B2B:Office vertical would run processes for sites for Office Depot, OfficeMax, Staples, and other office supplies vendors. The process is run for the high-level category (e.g., B2B), the sub-category (e.g., Office) and the sites within the sub-category. In embodiments, each site ends up getting a separate process launched on a separate node of the cluster of machines 214 of the calculator facility 210. The node knows where to look up a configuration file based on the hierarchy of verticals. The page extractor process 1810 reads in title and URL key value pairs. Then the process reads in reads in the CL5 files for that day, and it looks for data that matches these URLs/Title pairs to see if URLs from the CL5 files match these pages. This happens for all verticals. At the end of the batch, the system has a subset of a CL5 file with the date, a title (e.g., office depot) and a set of URLs that match the patterns for that site.

Once the page extractor process 1810 is complete, the fetcher module 1908 is engaged to run a fetcher process in a step 1812. The fetcher process reads a line in the file for a given site and determines whether it needs to update the data for that site. If so, then the fetcher process 1812 downloads the identified page. If the process has seen the identified page before, it can skip to the next one. If the fetcher process finds a new page, it downloads the page and puts it in the director of pages for that site. In embodiments the fetcher process only runs on certain nodes, because the host system must avoid flooding a site with downloads. The fetcher accesses an external network and in embodiments only runs on one or a few machines. The fetcher module can be programmed to now the maximum rate at which it should pull pages. In embodiments the fetcher module knows how to take codes for changed pages, moved pages, and indications that a site is not in operation. In each case it can produce alerts for the operator of the host system 200 to change something.

The next step in the verticals metrics calculation engages the classifier module 1910 is a classifying step 1814. Once the fetcher module 1908 has downloaded any new page identifiers, then for every URL in a given file (e.g., a file for Office Depot pages), the classifier module 1910 writes out a record to a fetcher database. In embodiments this can be a flat file hierarchy held locally and mirroring the live site, e.g.—officedepot.com/category/product/ID. Such a file can serve as an archive of the hierarchy of pages at the given site, including, for example, product directory files for all products offered at the site. The classifier module 1910 figures out for that day how many unique products it saw. In embodiments, it goes into flat file database and knows how to open the identified page and pull out the product information (title, description, price, shipping status, etc.). How to do that for a given site can be stored in the configuration file for the page extractor. It may be different for every site and page that the host system 200 tracks. Thus, the host system operator may have to come up with different patterns for the various pages and sites that it covers.

The classifying step 1814 takes the information and writes out another file. An example of a file structure would include elements such as the product name, the price, the quantity obtained for that price, the user ID, and the date. For example, it might appear as follows: Red stapler/$10.00/quantity 2/ID/date. The classifier module 1910 can do this for all of the different pages that are visited by users in the CL5 files for all of the CL5 files. In embodiments the classifier module 1910 can aggregate records across a category (e.g., B2B: Office). In such embodiments, a user of the data can compare products, such as all staplers, to see which ones users are viewing and buying. The classifying step 1814 can do this for office sites, retail, financial services, stock tickers, and other pages. In embodiments it can map a ticker back to the real name for the company.

Once a classifying step 1814 is complete, then at a step 1818 the system can rollup the files for the verticals calculation, as it does for the other metrics that are involved in job/batch processing.

The methods and systems described above cover three out of many possible metrics that can be calculated. Some metrics may be run with data just from the CL5 files that are generated in the pre-calculation processes disclosed above. Others require reference to an external data set as well as data from the CL5 files. Still others require access to page information, such as fetched from the Internet with the fetcher module 1908. Examples of metrics include, without limitation, unique visitors, search terms, verticals, cross-correlations between sites, uses of particular patterns of pages, and many others. Each different metric can have a unique calculator, typically running on a node of the cluster 214, using a program coded for that metric.

The various metrics can be used by analysts to deduce information that is relevant to many different kinds of business processes. For example, data about how users interact with pages that relate to applications for a quote on an insurance policy can produce insight into what is involved in converting an insurance shopper into an insurance buyer.

The data obtained can be quite comprehensive. In embodiments, it may consist of user interactions with many thousands of pages divided into hundreds or thousands of vertical categories.

Figure 20:
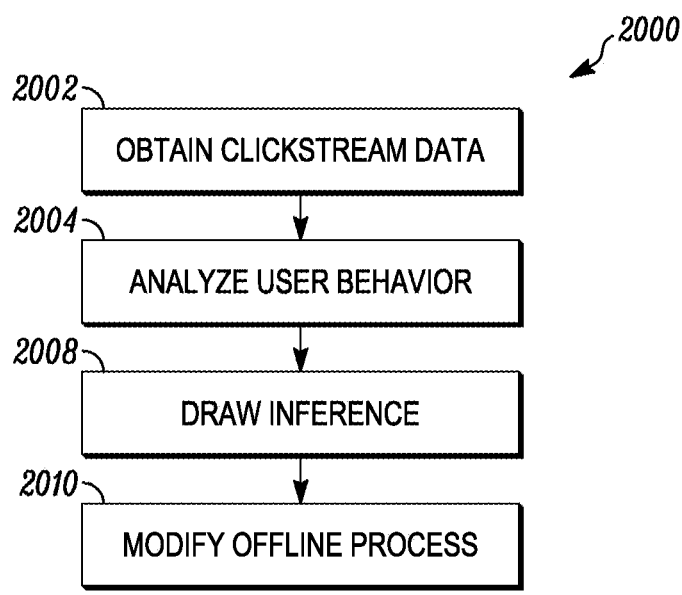
FIG. 20 is a flow diagram for a high-level business modification process of an embodiment of the invention.

Referring to FIG. 20, a flow diagram 2000 depicts high-level steps for a business process using data from the methods and systems disclosed herein. At a step 2002 the system obtains clickstream data about user behavior, such as through pre-calculation and calculation processes described above. Next, at a step 2004, an analyst analyzes user behavior based on the nature of the clickstream data. Next, at a step 2008, the analyst draws an inference about user behavior based on the nature of the clickstream data. Finally, at a step 2010, the analyst modifies a business process based on the inference. In embodiments, the analyst modifies an offline business process in response to inferences drawn from online user behavior.

The system 200 may further have a post-calculation facility 212 for merging, sorting and de-duplicating the files that are generated in the calculation process. After the post-calculation facility 212 completes these tasks, the files can be deployed internally to data warehouses, or externally to external data facilities, such as a co-location facility 118 that can be accessed by a client.

Data that is collected and processed by the methods and systems disclosed herein can be used as a basis for modifying a wide range of business processes. One area is in the promotion of goods and services. It is well known that demographic information can be used as a basis for designing product promotion; that is, certain groups of customers are more likely to purchase certain goods and services than others. For example, parents are more likely than teenagers to purchase baby strollers. Other information about user behavior can be used to assist in designing product promotion as well.

One embodiment of the method and systems disclosed herein is an improved method of promoting automobiles. Automobiles are typically promoted with incentives, such as low-interest financing, rebates, and the like. Presenting the right promotion at the right time increases the likelihood of making a sale while minimizing the cost of promotions. Understanding what vehicles a particular car model is being cross-shopped against regionally enables the design of incentives to take account of the varying competitive set. For example, if a customer shops for a Toyota Camry, is that customer more likely to look at a Nissan Maxima, or a Nissan Altima, either of which could be viewed as similar.

Knowing what cross-shopping is likely to occur allows a vendor to present incentives in a manner that accounts for the likely comparisons that the customer will make between the vendor's products and services and potentially competitive ones. The methods and systems disclosed herein allow an analyst to track cross-shopping behavior and allow a vendor to modify incentives in response to inferences drawn from cross-shopping behavior. By identifying regional variations and changes in the vehicles cross-shopped, an analyst can recommend incentives to fit the changed circumstances, thereby maximizing sales at the lowest incentive cost.

A second example would be brand positioning. One relevant factor in presenting a marketing message is the order in which the user has shopped various product offerings. For example, if an offering is the first one that a user has shopped, then it should be advertised in a fashion that encourages users to purchase immediately, rather than consider other offers. If the user has already seen more than one offer, then the subsequent offers need to be positioned differently. If a vendor is presenting an offer after many others have been considered, then the offer needs to be sufficiently arresting to get the attention of customer late in the process. So, for purposes of branding, messaging, and marketing communications, it is valuable for a vendor to know whether that vendor is typically the first vendor shopped, or whether the vendor typically comes later in the process. This is true whether the marketing message is presented online or offline.

By identifying patterns of online shopping for the products or services offered by a particular vendor, the methods and systems disclosed herein allow an analyst to determine the order in which a customer typically shops for products or services of that type. Then the vendor can select and present messages, promotions, and branding that is consistent with the position of the vendor in the typical shopping pattern. This approach can be used in any product or service sector, ranging from automotive, to retail, financial, and others.

Knowing customer patterns can also be useful for other business purposes, such as demand forecasting. For example, analysis of customer interest can determine if a predictable share of customers who have looked at a set of competitive products and services will purchase a particular vendor's product or service. Changes in the share of online users who research goods or services can be used to predict change in market share offline. Thus, by allowing tracking changes in online market share, the methods and systems disclosed herein can assist in offline business planning for changes that depend on changes in sales or market share, such as manufacturing and inventory needs.

Thus, data about online behavior can also help in forecasting demand. For example, in the auto market, knowing what people are researching (e.g., measuring frequency, recency and duration of online shopping for particular models), allows the business to forecast demand for particular make, model and trim in particular geographic regions. That forecast can be used allow a business to set inventory and manufacturing at optimal levels. Also online interest share changes (showing interest in a particular product) can be correlated to offline sales. Then the business can manage its supply chain and manufacturing to allocate the correct amounts of inventory to the right places at the right time.

Another area in which tracking online user behavior can allow strategic modification of offline business processes is in the area of retail store operation. Retail stores are designed to encourage users to see merchandise in a particular pattern. Stores are particularly designed to present complementary products near each other. For example, tortilla chips and salsa are usually presented in the same area of a supermarket. Also, the order in which a customer sees merchandise can make a difference in the likelihood the customer will buy a particular item. For example, studies have shown that people perceive the price of an item to be lower if they have previously been presented with a higher-priced item. For example, a forty-dollar tie seems less expensive if the customer has just selected a five hundred dollar suit. Moreover, the need for the tie may be more clear to the customer if the decision to purchase the suit has already occurred.

It is expensive and time consuming to rearrange a retail store to try to figure out which items should be presented together, and what order should be used to present items. In embodiments of the methods and systems disclosed herein, tracking user behavior online allows an analyst to draw an inference about what items should be presented together, and what items should be presented in what order, in a retail store. For example, if it is discovered that most online users who purchase personal computers also shop for printers, then an analyst might conclude that computers and printers should be presented together. In some cases the connection between the items might have been obvious, but in other situations a correlation between shopping for one item and shopping for another may not be readily apparent without the ability to track and recognize statistical correlations among items, a process that is made possible by tracking user behavior in the methods and systems disclosed herein. Thus, the methods and systems disclosed herein allow the user to organize merchandise in the physical world based on online behavior.

In addition to locating merchandise within a retail environment, it is also possible to draw inferences about how to locate an entire store based on analysis of user behavior online. For example, if goods and services of two different vendors are identified through statistical techniques as complementary, then one vendor may wish to select a location near the other vendor, even if the connection between the two is not intuitively obvious.

In other embodiments, data from online behavior can be used to draw inferences to develop offline business processes in the financial services area. For example, businesses need to determine what products and services should be offered through what distribution channel, whether it is an online channel, a call center, a branch, or an ATM channel. For example, financial advice and stock quotes might best be delivered through different channels. If online behavior shows that customers examine individual stock information online, but get confused with mutual funds, then a business can decide to put the individual stock information online, but to offer mutual funds through other channels, such as advisors in branch offices. Thus, figuring out the proper offline distribution channel can be done with the assistance of inferences drawn from online behavior.

Location decisions also benefit from online information. For example, if a business can learn where its competitor's online shoppers come from by zip code, a business can decide to locate its physical facilities in locations where the competitor's online shopper density is highest or lowest, as desired. This can help the business get new business from competitors, rather than cannibalizing its own customer base.

Other retail business processes can also be helped. By determining interest share by zip code, a catalog provider can, for example, drop the customized versions of a catalog by zip code to meet regional needs. Similarly, other direct marketing campaigns, such as mail campaigns, can be targeted to the right demographic and location based on online interest.

Pricing decisions also benefit from analysis of online behavior. For example, knowing how the number of transactions is affected when a price is changed can help a business determine an optimal price for goods or services. It can be also useful to know how many people shop elsewhere after a price increase, as compared to before. By looking at behavior across multiple sites it is possible to set prices at the highest point of price indifference. Thus prices can be tuned for online and offline offerings based on online behavior data.

It is also possible to watch behavior of a competitor's customers after the competitor increases prices. Also, a business can introduce price changes online to a limited set of customers to determine sensitivity before making more extensive price changes offline.

The methods and systems disclosed herein can assist media businesses as well. By determining the patterns and reasons for online migration between different online content sources, it is possible to draw inferences about the customer's behavior that allow the content to be designed to keep the user at a given content source. For example, if a readers of Forbes regularly depart its online site to look at particular portions of Fortune's online site, it is possible to redesign the content of the Forbes site to contain similar content, thus diminishing the chance the reader will depart. Thus, behavior online can be used to help redesign media content to retain customers. Media businesses can also use online behavior to identify geographic areas of interest and other demographic areas of interest for books, music, news, film and other content. In turn, offline channels of distribution for media content can be altered to target particular geographic or demographic groups. Also, media businesses can target attracting customers based on their online behavior profile with a view to maximizing the attraction of the "best" or most loyal customers.

It is also possible to forecast demand for media content. For example, web traffic at particular sites related to upcoming movie content may tell film distributors which films should be shown on which screens and for how long. Media providers can also determine what kind of related merchandise to sell along with the media, and what kinds of promotions to engage in. The data can be used to determine appropriate franchising arrangements as well, such as how much to charge for a franchise to distribute toys or other novelties that reflect characters in a film.

Similar forecasting can be used before release of a new musical composition, book, or other media work.

Shifting consumer attitudes and the presence of multiple connected devices have enabled complex paths to consumer purchases. The conventionally understood singular, orderly sequence of purchase stages, such as might be depicted in a purchase funnel diagram, has been scrambled, and marketers need to adjust. Given that consumers have access to constant information through computers, smart phones and tablets, each person's path to purchase is complex and potentially different. Fragmented audiences, distracted consumers and multiple devices fuel different paths. The explosion of digital channels, the always-on media ecosystem, and the emergence of increasingly discerning consumers challenge even the savviest of digital marketers. Many marketers are designing a path to purchase strategy based on an outdated model, and a need exists to benchmark or measure success in a rapidly evolving digital marketplace.

For consumers, there are unlimited opportunities to get distracted throughout the shopping process. Consumers can get to the brink of a purchase and then regress back to researching and browsing—because it's easy to do. Whether on their desktop, tablet or smartphone, shoppers are just one click away from embarking on navigation far away from their original intent. The good news is that a single point of contact with a user, also known as a touch-point, can transport them back to the brink of a purchase too.

For marketers, it is a challenge to identify and map the ideal shopping behavior for their brand. Each individual path may be different, and actual activities vary widely between consumers, across multiple platforms. However, while numerous, the combinations of individual touch-points, and the paths among them, can be specified. It is not just what consumers do that is important; it is also how, when and why they do it. The timing, location, and intensity of consumer behavior indicate levels of involvement at particular touch-points within the path to purchase and opportunities for marketers to engage. Analysis of this behavior can provide actionable insight into how consumers arrive at their purchase decision.

As consumers use more digital platforms and channels for research and buying, there is a need to invest, strategically and financially, in tools and platforms that measure beyond traditional web analytics. There is a need to understand engagement activity (e.g. search, review and cross-shopping, mobile/tablet engagement) before, during, and after the customer conversion. The path to purchase model is shifting to include a plurality of digital touch-points. Consumers are distracted, but smarter. Marketers can be smarter too. This disclosure gives marketers context and insight into the evolving path to purchase in various vertical markets, as well as systems and methods for building a strategy to better shape their marketing efforts.

Consumers are changing the way they research and purchase online, and new shopping paths are emerging depending on behavior, device, location, and intent. Marketers have much to gain from re-evaluating existing strategies and identifying ways to improve their brand's bottom line. The key to successfully decoding this new consumer behavior is pairing an uncomplicated mindset with complex reporting abilities. In adapting to this new path to purchase reality, one thing marketers can do, using the methods and systems disclosed herein, is develop a strategy that does not assume, or depend on, a single, linear sequence of events as envisioned in the traditional purchase funnel model. When each independent step along the path is improved, the end result will be more purchases, regardless of how consumers got there.

The Digital Touchpoints™ facility provides insights on actual consumer interactions, enabling companies to make the most effective marketing decisions. A better understanding of the sequence of shopping events equips companies to deliver the correct marketing message at the right place and at the right time during the shopping process. To do this, the Digital Touchpoints™ facility measures the ways consumers interact with shopping touch-points in three ways: 1) The Engagement Index™ represents the extent of actual shopper engagement with touch-points. This takes into account the percent of total shoppers interacting with the specific touch-point, and the intensity of those interactions, including time and number of repeat visits; 2) The Influence Index™ represents the probability of one touch-point interaction influencing a shopper's final action; and 3) The Opportunity Index™ shows the competitive view of touch-point interactions (e.g. which brands are getting better or worse traction with consumers at each given touch-point). The goal of this report is to enable marketers to make strategic shifts in how they approach the new fluid path to purchase, to quantify and qualify consumer behavior, and to take action. The right tools lead to actionable insights and informed digital marketing decisions that drive brand, market share, and ROI.

The digital touch-points facility may utilize clickstream data in its analysis of the patch to purchase. One method to collect clickstream data is from a panel, described previously in US 20070055937, which is hereby incorporated by reference in its entirety. In one embodiment, panel data may be collected by a data collection agent (DCA). The DCA is responsible for the recording of user web browser click event data as the user navigates the web and modification of the data such as to remove personal data or irrelevant clicks prior to sending the data as a clickstream file to a server for further analysis. In embodiments, the DCA may be a web browser plug-in or some other helper object capability of the client station. Web browsing behavior may be derived from an analysis of the clickstream data by a calculation facility associated with the server. The calculation facility may comprise software modules and one or more machines for running calculations on the clickstream data to obtain metrics, comparative data, impact data, and the like. The DCA can be used to monitor: what websites a user visited, what keywords they search on, what search results were obtained, and online behavior after the search. Multiple users of the DCA may comprise a DCA panel. The DCA panel may be used to collect data regarding specific internet traffic.

The data collected from the DCA panel may first be normalized according to a methodology that leverages scientific multi-dimensional scaling to ensure metrics are representative of the Internet population. DCA panel members may be recruited through multiple sources to ensure a diverse distribution of user types and to facilitate de-biasing across the data sources.

In some embodiments, data collected by the DCA may be used to determine a user's web browsing behavior and patterns across many different websites, whether or not traffic at those websites is monitored independently. Web browsing behavior for a panel of users of the DCA (DCA panel) may be determined using data collected from the panel by each DCA used by the panelist. In some embodiments, the panel data may be used to estimate the web browsing behavior of the internet population in general. For example, one metric may simply be internet traffic at a particular website. In the example, data from a panel of users may be weighted to determine or estimate actual traffic levels for all internet users. Weighting involves determining the percentage of the population represented by the panel and using that representation, or weighting factor, in further calculations. For example, all unique visitor numbers for sites or page impressions in the panel data may be multiplied or weighted by the weighting factor in order to estimate the actual traffic levels.

The digital touch-points facility may also utilize mobile internet activity data, either alone or in combination with panel data, in its analysis of the path to purchase. The digital touch-points facility may be able to use single source data, such as data from panel participants who are tracked using the DCA and a mobile-enabled solution, data from purchase panelists who are tracked by another clickstream (e.g. the DCA, mobile), data from existing panels who are tracked by another clickstream, and any combination thereof. In another embodiment, disparate data sources for a single user may be aggregated for analysis by the digital touch-points facility in order to more robustly infer a path to purchase.

Panel data may be analyzed in order to understand internet browsing behavior prior to a purchase, such as what web sites were reviewed, how long a research period lasted, if forums were reviewed as well as or instead of editorial content, and the like. In embodiments, a portion of a panel of users can be surveyed to determine offline behavior for panelists, including purchases made either in store or online and various details regarding such purchases. Then, the user's clickstream activity for a time period prior to the purchase can be analyzed to determine their path to purchase. In other embodiments, since there is demographic data for each of the panelists, they can be matched to data for offline behavior. For example, the data may be matched by address, name, phone number, email address, credit card number, and the like. When a match is made, the user's clickstream activity for a time period prior to the purchase can be analyzed to determine their path to purchase. Since data are already gathered for the panelists, the appropriate filters need only to be set to examine the data of interest.

In one embodiment, the matched panel data may be weighted. For example, the weighting may be in accordance with overall sales among online users by demographic characteristic, purchase characteristic or the like.

Figure 21:
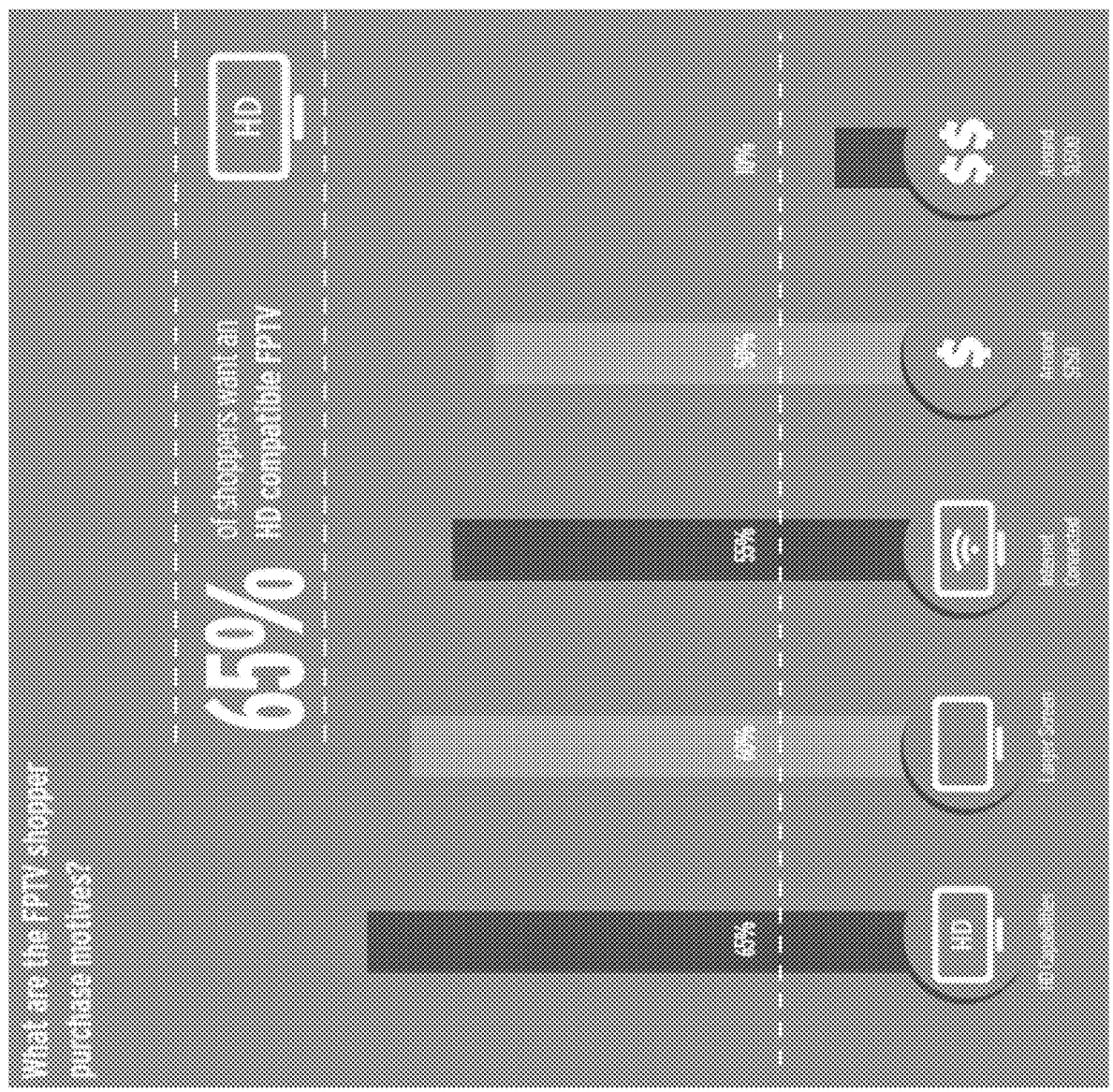
FIG. 21 depicts a graph 2100 with various flat-panel TV shopper motives.

In one example of a vertical, when shopping for a new Flat Panel TV (FPTV), consumers are looking to upgrade their device, improve their home viewing situation, purchase an FPTV for a new room or home or simply replace a broken television. This data is important—the "why" consumers are shopping for FPTVs helps determine "what" consumers are doing along their path to purchase. Referring to FIG. 21, selected FPTV shopper motives include a desire for: an HD-compatible model, a larger screen TV, an Internet-connected TV, and a TV in a certain price range.

When purchasing a new FPTV, the desire to upgrade is a motivator. Shopping for a FPTV typically takes 11 weeks, one of the longest processes analyzed. Consumers often conduct their TV research online, but still visit a physical retail location to purchase. The first shopping phase typically occurs in the first four weeks while consumers are researching brands and determining their price range. Phase two is typically in the middle four weeks, when they move further down the path and determine which brands and models are the best fit. In the final three weeks, shoppers are typically compiling their research and have narrowed down brands, models and the best deals.

Figure 22:
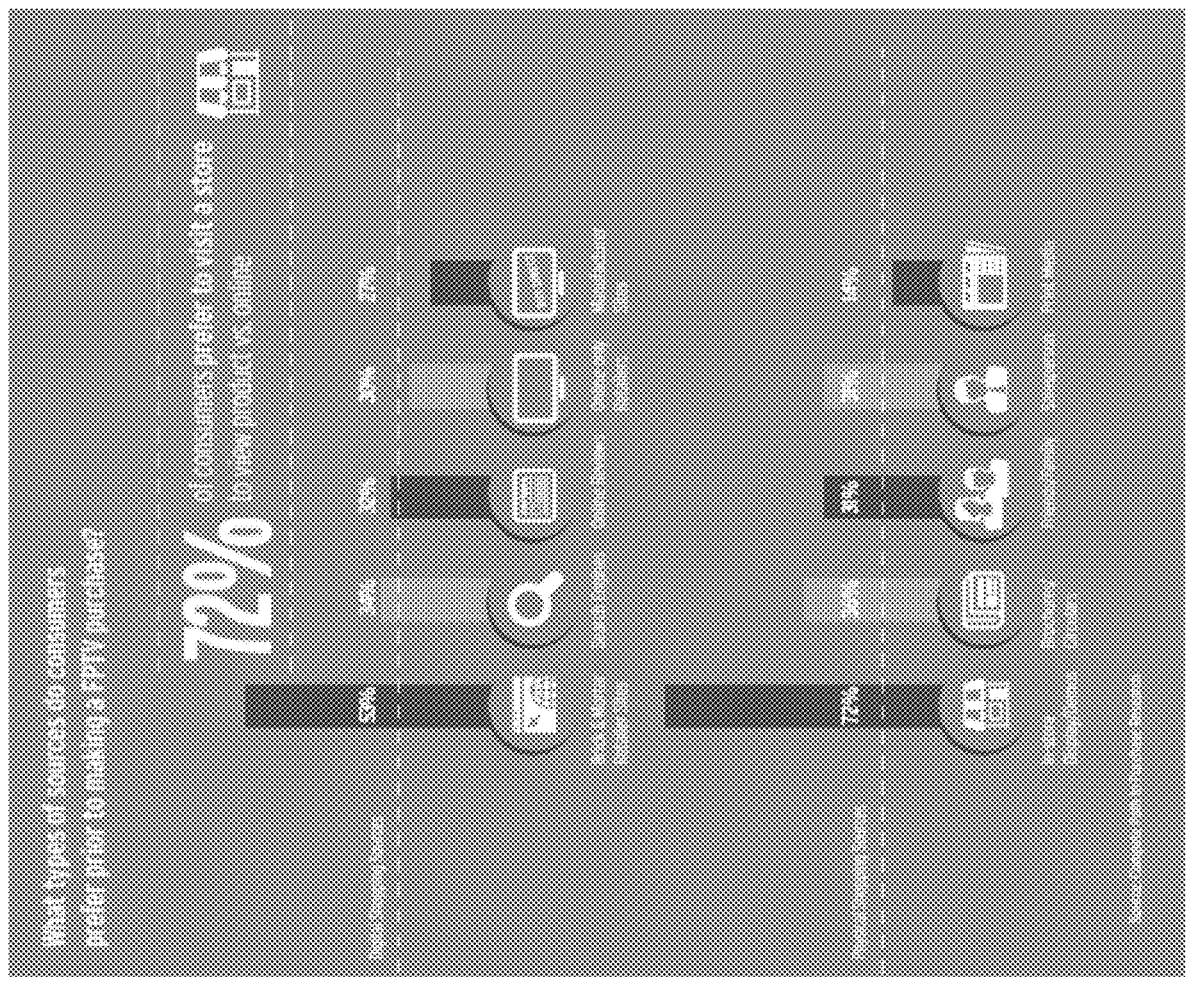
FIG. 22 depicts data 2200 for FPTV shopping sources.

Referring to FIG. 22, path to purchase research using the digital touch-points facility has demonstrated that most FPTV shoppers have a tendency to research online and to purchase offline, making both digital and physical channels important pillars of any marketing strategy. The brick-and-mortar retail location is still a popular place to actually make a purchase, but only one third of shoppers will typically use only a physical retail location for research. According to one estimate, 72% of consumers prefer to visit a store to view a product versus online. Even during traditionally busy seasons—holidays when online traffic increases by up to three times—online purchase rates stay the same, underscoring the role of retail stores in the purchase. Although most consumers are buying in physical retail locations, it is still important to allocate resources toward digital efforts, as online experiences help build brand preference and drive shoppers to the store. Referring to FIG. 22, also according to the digital touch-points facility, selected digital shopping sources for an FPTV include brick & mortar retailer sites, search engines, online reviews, online-only retailers, and manufacturer sites, shown in decreasing order of percent of consumers. Selected physical shopping sources for an FPTV include in-store display/demos, brochures/circulars, friends/family, salesperson, and print media, shown in decreasing order of percent of consumers.

Companies can maximize search performance since FPTV shopping starts online. Companies can enhance web design and improve user experience because manufacturers' websites are one of the last online touch-points before a consumer visits a retail location, according to analysis by the digital touch-points facility. Companies can streamline the physical retail shopping experience as interaction with sales representatives and product displays are shown by the influence index to be influential touch-points when shopping in brick-and-mortar stores.

Search engine optimization (SEO) should drive consumers to the brand website as early in the process as possible for brands to engage their audience. Online search will drive top-of-purchase funnel activity, improve brand credibility, and increase the overall sales pipeline. According to the engagement index, manufacturer websites are one touch-point in the path to purchase. If consumers prematurely leave the brand site, there is a lost opportunity to direct them to a physical location to buy electronics. Knowing this, brand marketers need to make improvements in the website experience to increase the number of leads walking into a retail location with purchase intent. Once qualified foot traffic is sent to retail locations, the work is not over for marketers. Offline budget needs to be dedicated to ensure that the in-store experience and materials have the same quality treatment and information as all the other brand materials consumers are exposed to during the shopping process. At the in-store level, investments should be made to train sales personnel on product features and other ways to improve the customer experience during the middle-to-late stages of the shopping process. For lesser-known brands, there is an opportunity to convert FPTV shoppers. According to the opportunity index, while major brands like Sony, Panasonic, Samsung, and LG have traction in the beginning of the shopping process due to better unaided awareness, smaller brands can gain popularity toward the end as consumers understand product specifications better.

Figure 23:
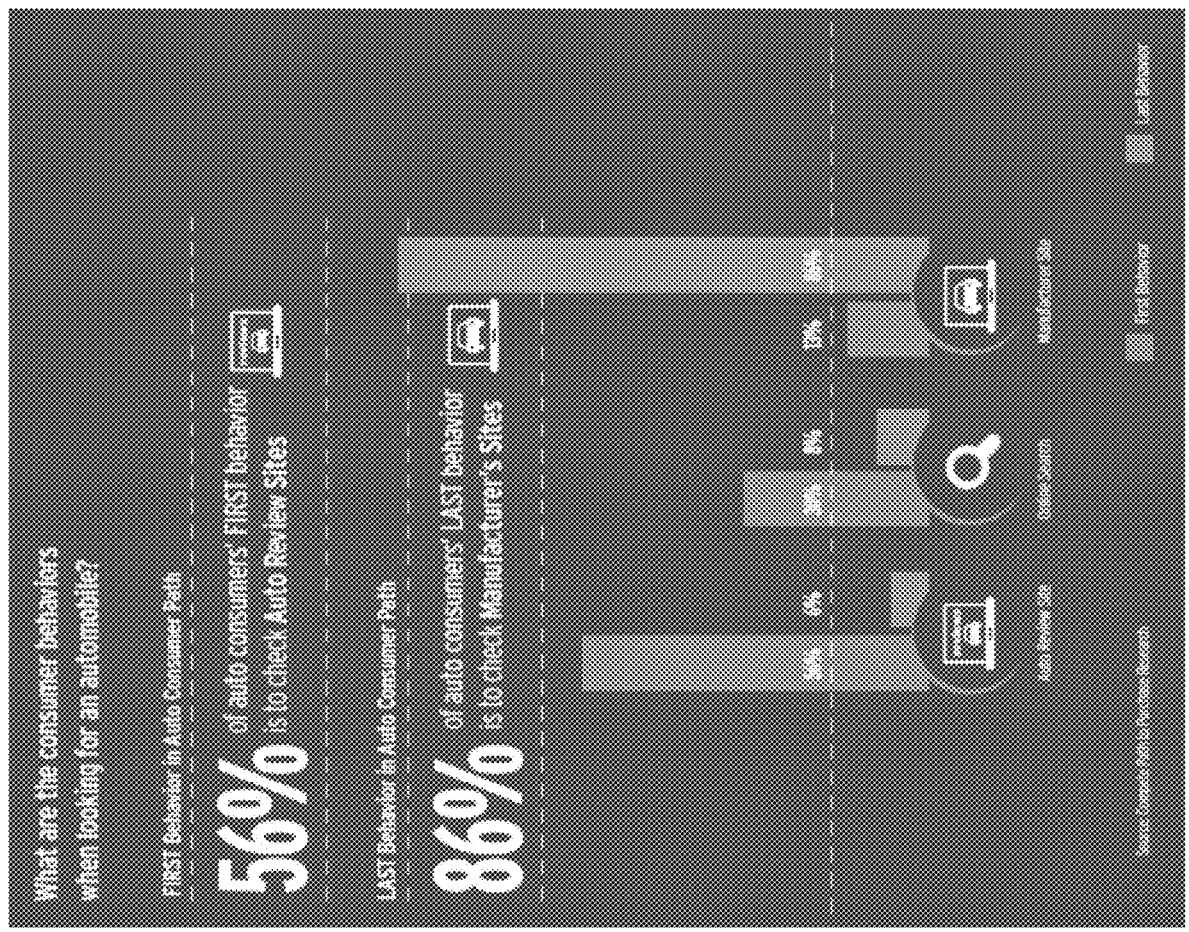
FIG. 23 depicts data 2300 for an automobile consumer's path to purchase.
Figure 24:
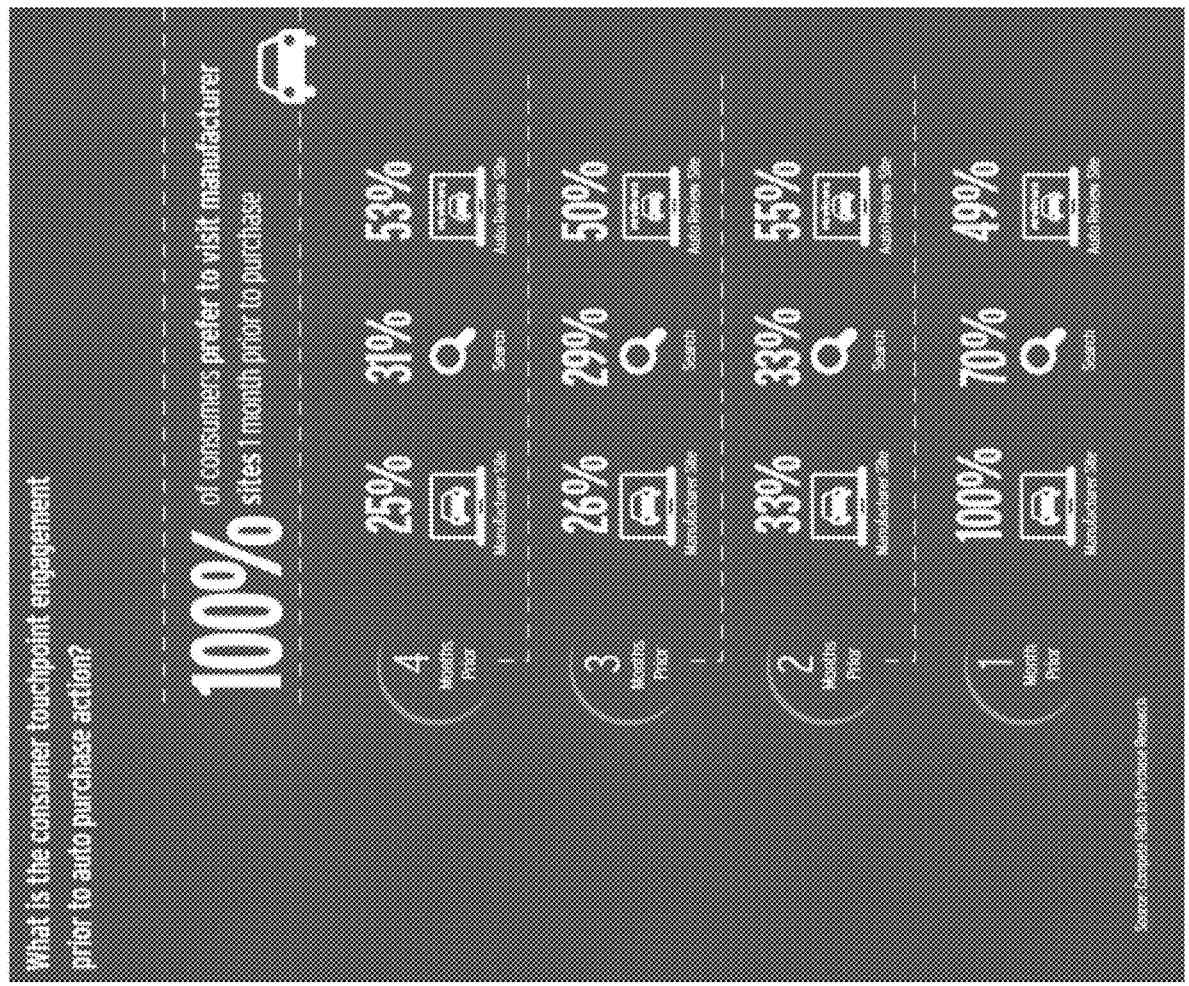
FIG. 24 depicts data 2400 for an automobile consumer's path to purchase.

In another example of a vertical, the automotive consumer journey is can benefit from analysis to understand a path to purchase. Although consumers buy vehicles at dealerships, most of the decision-making process and influential touch-points are online 85 to 90 percent of auto shoppers may conduct online research. According to the digital touch-points facility, the typical car shopper begins the process on a search engine or review site and ends at the brand's domain, before heading to a dealership. The online research process typically lasts, on average, four months, with an uptick in activity in the last month. More activity at the end suggests the traditional purchase funnel is upside-down. Auto shoppers' behavior can be diverse, but may be grouped into three distinct online shopper paths, culminating in an "expression of interest" for one or more models. Purchasing a new automobile is a very big decision, and for some consumers, the most costly purchase they will make. There are a myriad of digital touch-points, from manufacturers' sites, to third-party sites, to review sites, to enthusiast sites, and even general information sites that have auto sections. Even though every consumer's path is unique, three paths may be identified based on some common characteristics: 1) High Category Involvement: These consumer paths are characterized by a heavy use of auto review sites, search, and competitive brand sites, before reaching the "expression of interest" phase; 2) Brand Pre-disposition: This path category typically begins with visits to auto review sites and search engines, but quickly progresses to expression of interest; and 3) High Social Network Involvement: Consumers on this path category rely more on manufacturers' social media brand pages. The first path typically begins with visits to auto review sites or with queries on search engines, which ultimately lands consumers/shoppers on automotive brand sites. The process may repeat several times during the journey, with increasing visitation to the brand site in the last month before purchase. The second path is typically composed of consumers predisposed to a specific brand—they start with search and reviews, but quickly narrow down to specific manufacturer pages. This path is different than the third path, which is characterized by a stronger reliance on visits to social media brand pages; paths one and two have a much lower use of automotive social media. While each is distinct, there are some common patterns across each path. Referring to FIG. 23, for example, more than half of the shoppers start the process on an auto review site. 56% of auto consumers' first behavior is to check auto review sites, but for 6% of auto consumers' it is their last behavior. 30% of auto consumers' first behavior is an online search, while for 8% of auto consumers', it is their last behavior. Referring to FIG. 24, two thirds of auto consumers that demonstrate intent to purchase begin searching four months prior to purchase, with a noticeable uptick in action in the final month. By the end of the process, 86 percent of those showing signs of purchase engage with a manufacturer's site, while only 13 percent start there; the 86 percent is good news for automakers and the 13 percent means there are a lot of potential disruptions along the path to purchase. By 1 month prior to purchase, 100% of auto consumers prefer to visit manufacturer sites. Given the heritage of many automotive brands, brand association is often a powerful influence, and that association can be expressed in multiple and, sometimes, unexpected ways. One brand's effort to drive consumers exclusively to its YouTube channel resulted in the brand's homepage getting a wealth of purchase-intending traffic. Social networking, music, and video sites are highly visited categories for multiple auto segments, but a key question is whether they create brand-new relationships or reinforce existing ones.

Shoppers kick off the auto research process in several ways: search, social media, and independent reviews. Knowing where and when consumers use them is crucial because those touch-points influence which brands consumers investigate further. Companies can understand where and how consumers research vehicles—theirs and rivals'—with a focus on the most likely inflection points (e.g. places companies are most likely to lock down or lose customers, and places where companies have the best opportunity to conquest rivals' shoppers). Companies can optimize keyword investments to ensure they are investing in the terms and techniques most likely to drive consumers their way. Search is a strong driver of purchase intent and can aid brand credibility. Companies can quantify how and when consumers use auto review sites, then determine whether deeper partnership relationships with those entities will help drive traffic. The majority of brand site traffic comes from review sites. Companies can find the right balance of keyword activity (including competitive keywords), have a structured presence on social media channels (proven to generate consumer interest and increase automotive research activity) and monitor review sites (shown to engage the audience and maintain traffic flow to conversion). It is imperative that automotive brand websites are optimized to encourage quick action in driving a buy, or, at least, starting a dialogue between dealers and consumers. Companies can ensure their brand site is optimized for a consumer experience based on the research process up until that point. Companies can find the right balance between site flash and allure vs. ease of use. Companies can make sure that consumers who are coming into the brand site (via search or review sites) land on the appropriate page. The manufacturer website is often the last chance to interact with consumers, and manufacturers need to keep them from defecting to ensure that they head to the manufacturer's dealers. Consumers buy new vehicles at dealerships, but the research process is typically online, with 85-90 percent of auto consumers conducting online research. Automotive buyers don't purchase on brand homepages, but those sites are among the last digital opportunities to influence consumers and encourage them to take the next step and visit a dealer. Companies can engineer their consumers' paths so what they learn along the way is consistent with what they find in the dealership.

Figure 25:
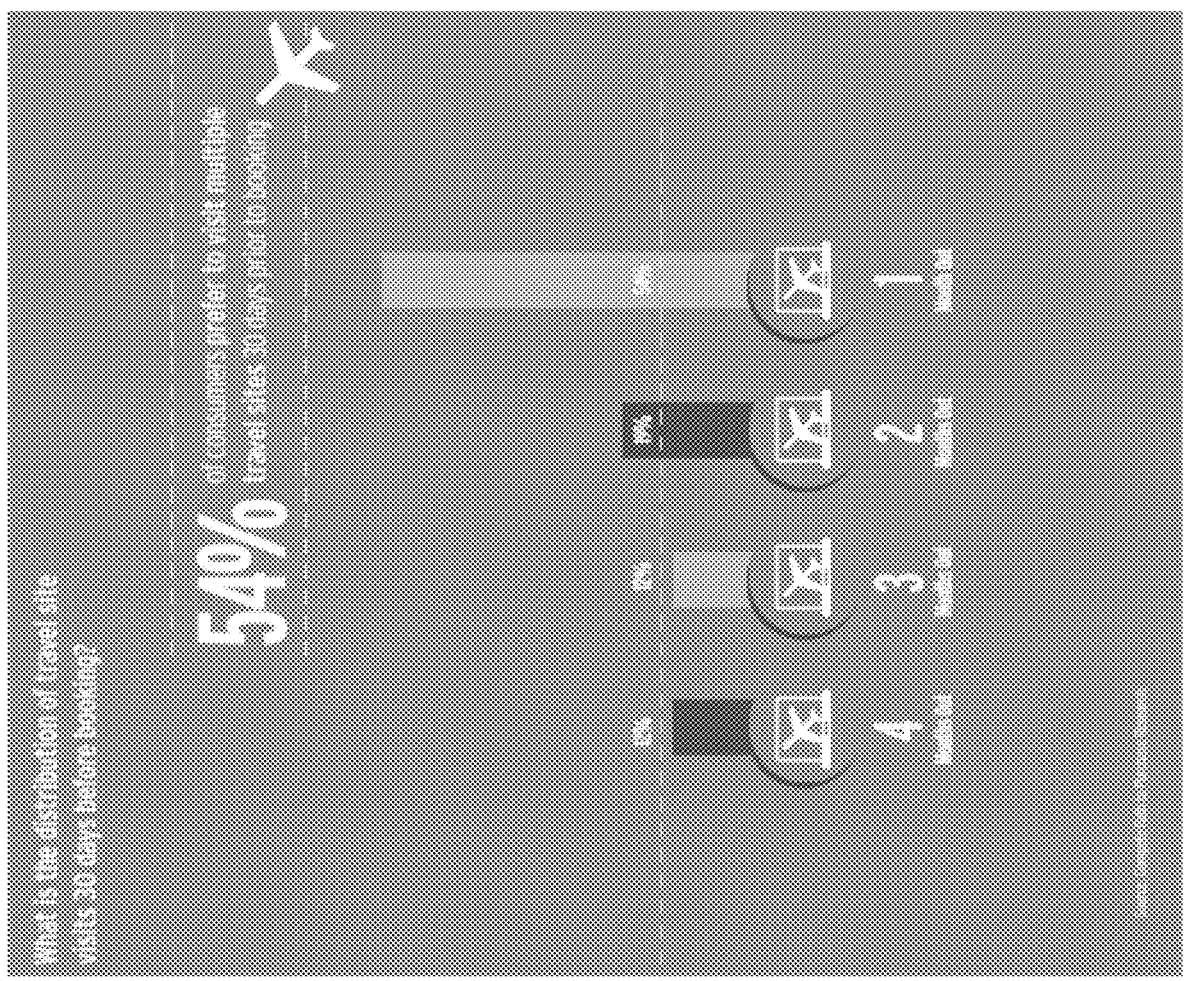
FIG. 25 depicts data 2500 for the distribution of travel site visits.

In another example of a vertical, the online travel marketplace is large and dynamic because consumers spend more money online for travel than any other industry. An average hotel booker typically visits 12 travel sites before booking online. The order, time, and intensity in which consumers visit travel sites vary greatly. There are shared shopping characteristics between different categories of bookers (e.g. when initial research starts), but the nuances within those groups are different. The digital touch-points facility's analysis of traveler behavior found the path to purchase to comprise various "stand alone" steps. This reflects that travel often requires distinct elements, such as booking a flight, then selecting a hotel near the chosen airport, then renting a car near the airport and/or hotel. Marketers need to recognize that these distinct points of influence are all intertwined, and streamlining this process will drive travel bookings and set the stage for partnerships and conquesting. The digital touch-points facility's analysis of traveler behavior found that the frequency and duration of research changes based on where consumers are in the shopping process, dictating that the marketing approach be nonlinear. Hotel bookers typically visit a quarter of their pre-purchase travel sites on the same day they book. OTAs (online travel agencies) are the most visited category among hotel bookers, and the average hotel shopper makes 12 visits to OTAs in the same month as booking. More than half of these visits occur during the week of booking and even more occur within the last 48 hours of booking Referring to FIG. 25, 54% of consumers prefer to visit multiple travel sites 30 days prior to booking Flight research paired with airline site visits is one of the few common behavior traits across hotel bookers' paths. While the instances of flight research adds some structure to understanding the path, the diverse nature of travel sites adds to the complexity. For example, consumers can book hotels on supplier sites (sites operated by the brands themselves). They can also book hotels on OTAs, and once they're on an OTA, they might also buy a flight and rental car. At the same time, hotel sites often allow consumers to book flights, and airline sites often allow consumers to book hotels.

Figure 26:
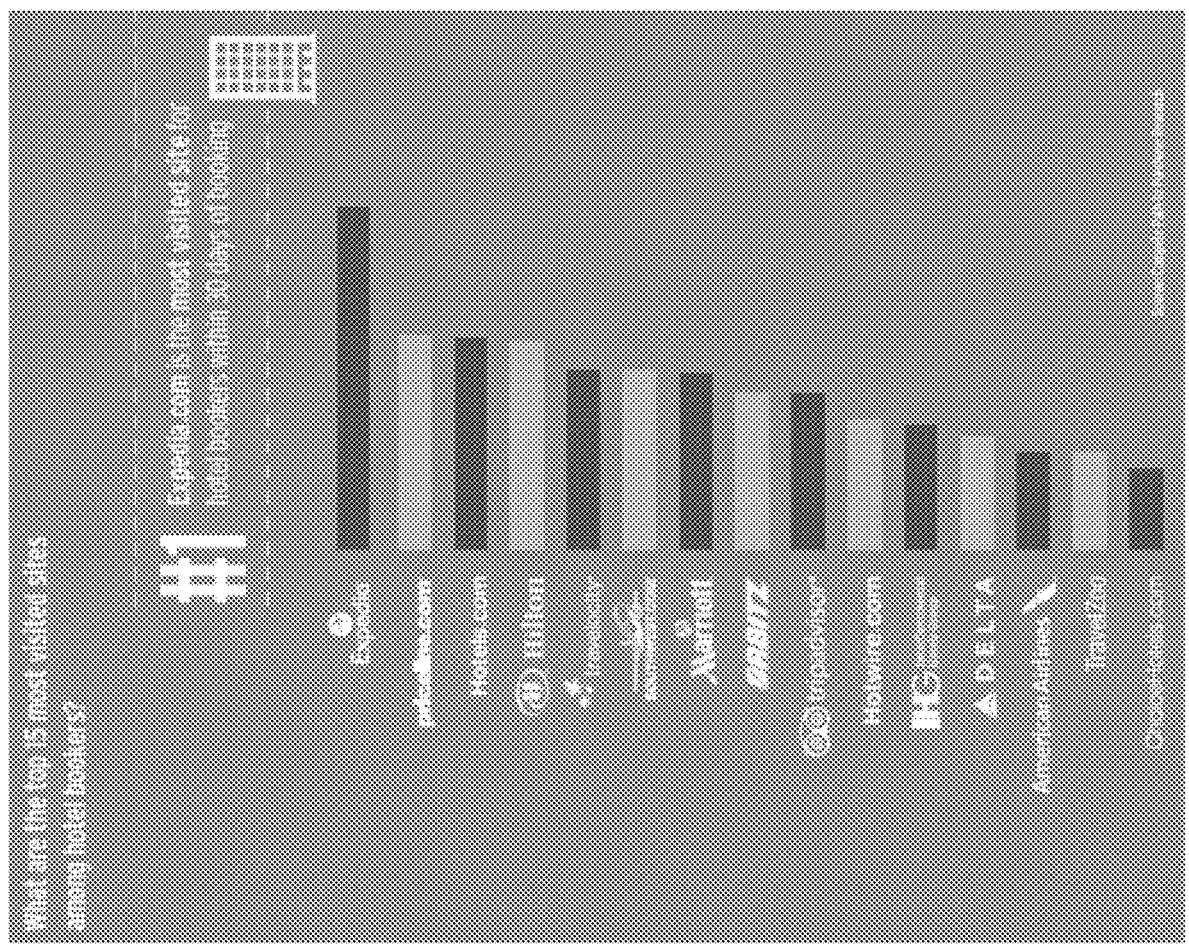
FIG. 26 depicts data 2600 for the top 15 sites visited by hotel bookers.

Understanding the optimal places to influence behavior and drive revenue (e.g. search, flight, OTA/hotel, supplier, etc.) enables brands to attract qualified consumers. Companies can prioritize revenue by reinforcing behavior among consumers already leaning their way, by minimizing conquesting of consumers by rivals, and by identifying the most valuable lost bookers. Companies can determine how site tools influence booking choices and how they can be used to measure pre-booking audience quality. Companies can compare the return on investment (ROI) of using a full path approach vs. a singular point approach to target specific audiences. Path to purchase knowledge incorporates how consumers get to a particular travel site and how many of them visit the site but book somewhere else, which is called "lost bookings" and is a key element in understanding how to use consumer behavior to unlock low hanging revenue. For example, a hotel can assign a value to adding OTA-style search capability to its site, based on the likelihood of increased conversion by reducing lost bookings Understanding which tools correlate with travel booking decisions on a company site and rival sites can help inform site redesign strategies, such as adjusting site landing pages based on the combination of traffic source and tool use. For example, knowing if consumers are more influenced by search than OTAs could inform landing page tactics from paid search results and advertisements. If the biggest break in the path for a given hotel is the moment after choosing a flight, that hotelier could consider a partnership with an airline with which its lost bookers are already engaged. Referring to FIG. 26, the top 15 most visited sites within 30 days of booking among hotel bookers are shown. Companies have the option for a broader effort designed to influence many elements of travel shopping or a more focused approach with rich attention on just one element. Both can influence revenue through the new, evolved path, but need to be cost-effective; the right choice depends on where the biggest loss of consumers is at the instant moment.

Figure 28:
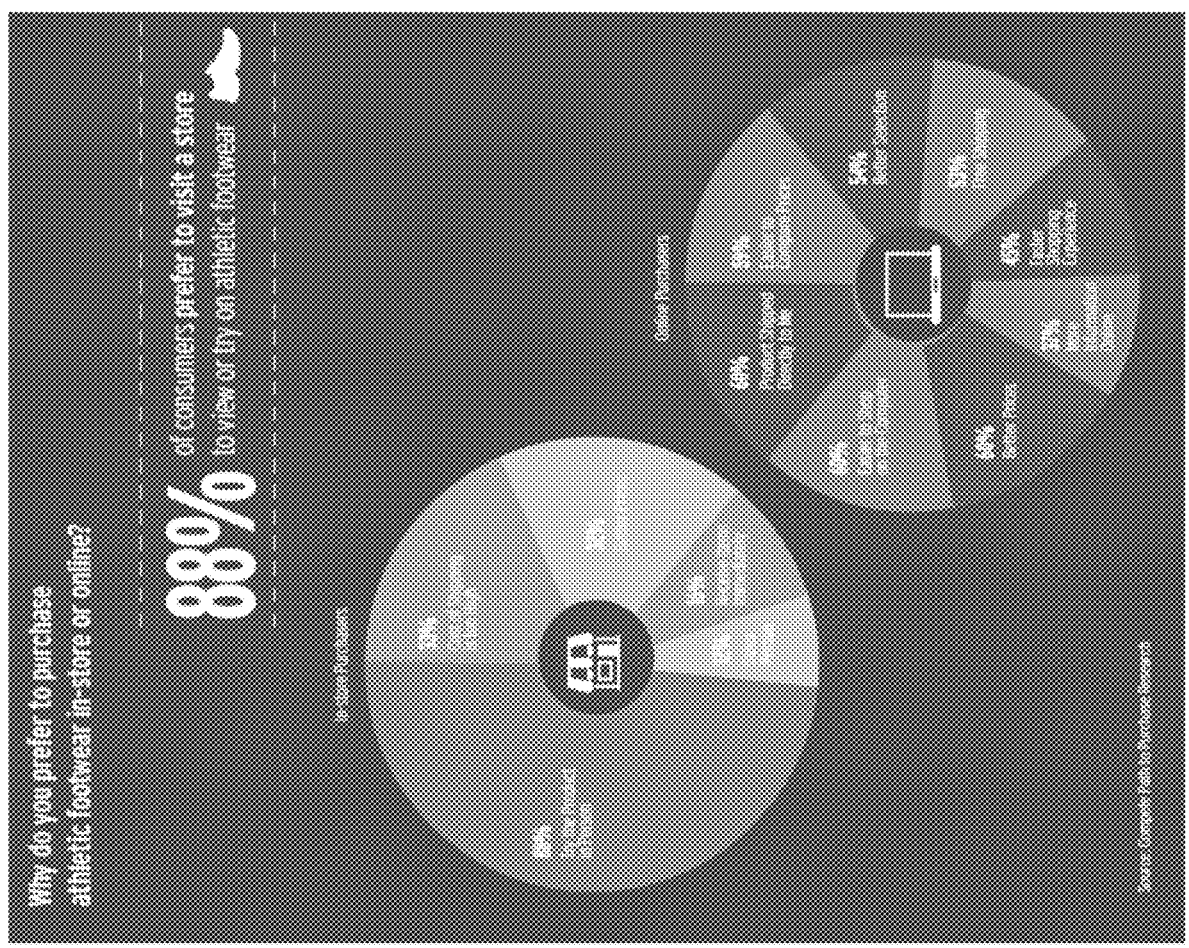
FIG. 28 depicts online versus in-store preference data 2800 for athletic footwear purchases.

In another example of a vertical, there are several key elements that influence the athletic footwear path to purchase: online retailers, brand properties, consumer reviews, the physical store experience, and online search. Athletic footwear shoppers consult online resources for product and seller information. One in three prefers purchasing online rather than in a traditional store. Along the path to purchase, shoppers use brand websites for research, but these sites are typically not a purchase destination. Shoppers choose quickly and don't spend much time researching. The purchase window for athletic footwear is narrow. Starting with the online experience, the digital touch-points facility's analysis found that consumers primarily discover new products through site channels (e.g. retailers or online pure plays), consumer reviews, and fitness research websites. The path to purchase is notably short as online athletic shoe shoppers are likely to know exactly what brands and/or products they are interested in from the start. On average, purchasers spend six minutes shopping for athletic footwear, significantly less time compared to other categories. They spend little actual time "researching," opting instead to search for the best deal. Not surprisingly, a lot of sales are shifting online; in fact, nearly one in three consumers favor purchasing athletic footwear online versus in-store. However, and referring to FIG. 28, the offline experience is also still relevant: nine in 10 consumers who opt to purchase in-store do so primarily to try the footwear on and secondarily, to get the shoe immediately and avoid shipping costs. Additional reasons include better prices and presence of a sales person. Consumers who opt to purchase online do so because it is easier to shop on the computer, easier to compare prices, to get the product shipped directly, to have a better selection, to get free shipping, to get better prices, because more information is online, for a faster shopping experience, and the like. Of those who do buy online, 20 percent of these consumers try the footwear on in a store before going online to make the purchase, highlighting the role of the offline channel even in an online transaction.

Figure 27:
FIG. 27 depicts data 2700 for athletic show purchase research.

Referring to FIG. 27, 71% of in-store purchasers visit a store while only 20% of online purchasers visited stores. 59% of in-store purchasers looked online while only 55% of online purchasers looked online. 21% of in-store purchasers saw advertisements while only 14% of online purchasers saw advertisements. 13% of in-store purchasers read reviews while only 8% of online purchasers read reviews. Only 4% of in-store purchasers performed no research while 24% of online purchasers performed no research.

Finally, search is a significant driver of athletic footwear sales and improves brand consideration. Each month, athletic footwear sites receive 16.5 million search referrals, of which online pure plays and department stores capture the largest shares. Manufacturers garner the smallest share of athletic footwear searches, yet have the highest share of paid search. Under Armour, Converse, and Nike, the top three brands driving traffic through branded keywords, generate a substantial portion of those click-throughs with paid search. Recommendations for the retail industry revolve around understanding and adapting to the realities of the new path to purchase rather than trying to change it. Looking across the online ecosystem, shoppers who visit a manufacturer's website are a temporarily captive audience, but eventually move on. Companies can engage and convert. With a short shopping process, all touch-points need to quickly encourage a transaction. Companies can overcome the consumer obstacles to purchasing online. If a company can't offer free shipping, for example, consider offering additional value like a quality guarantee. Companies can build experiences on brand and retail sites that link initial research to shopping transactions. The brand website experience can be attention grabbing, but many consumers travel elsewhere to complete their purchase, influenced by price and convenience. The opportunity lies in how manufacturers and retailers can partner to best influence these in-market consumers. For brands, one way to alleviate consumer hesitancy when shopping directly on a manufacturer site is to promote free shipping and a no-risk, no-hassle return policy. If manufacturers are unable to offer free shipping or flexible returns, there are additional ways to add value and enhance the experience of purchasing on the brand site. The ability to speak with a specialist, lifetime quality guarantees and interactive product viewing abilities can retain consumers and increase purchases made through brand e-commerce efforts. The best strategy for brands and retailers could be embracing their roles in overcoming the obstacles to conversion. Properties should build online experiences that link online search to brand site visits to retail transactions. Depending on the manufacturer, some sites are primarily a research tool that drive traffic to retailers while others focus largely on ecommerce. Both manufacturers and retailers benefit when they enhance their greatest areas of influence and rely on partners to bolster the touch-points that bring consumers to purchase.

In an example of another vertical, within the financial category, the process of product selection to account opening is a short one, for which consumers primarily research online, but convert offline. During the initial research phase, online resources, such as review websites, have a larger consumer impact compared to traditional media; 48 percent of consumers only use online resources, and 21 percent rely on offline tools.

Figure 29:
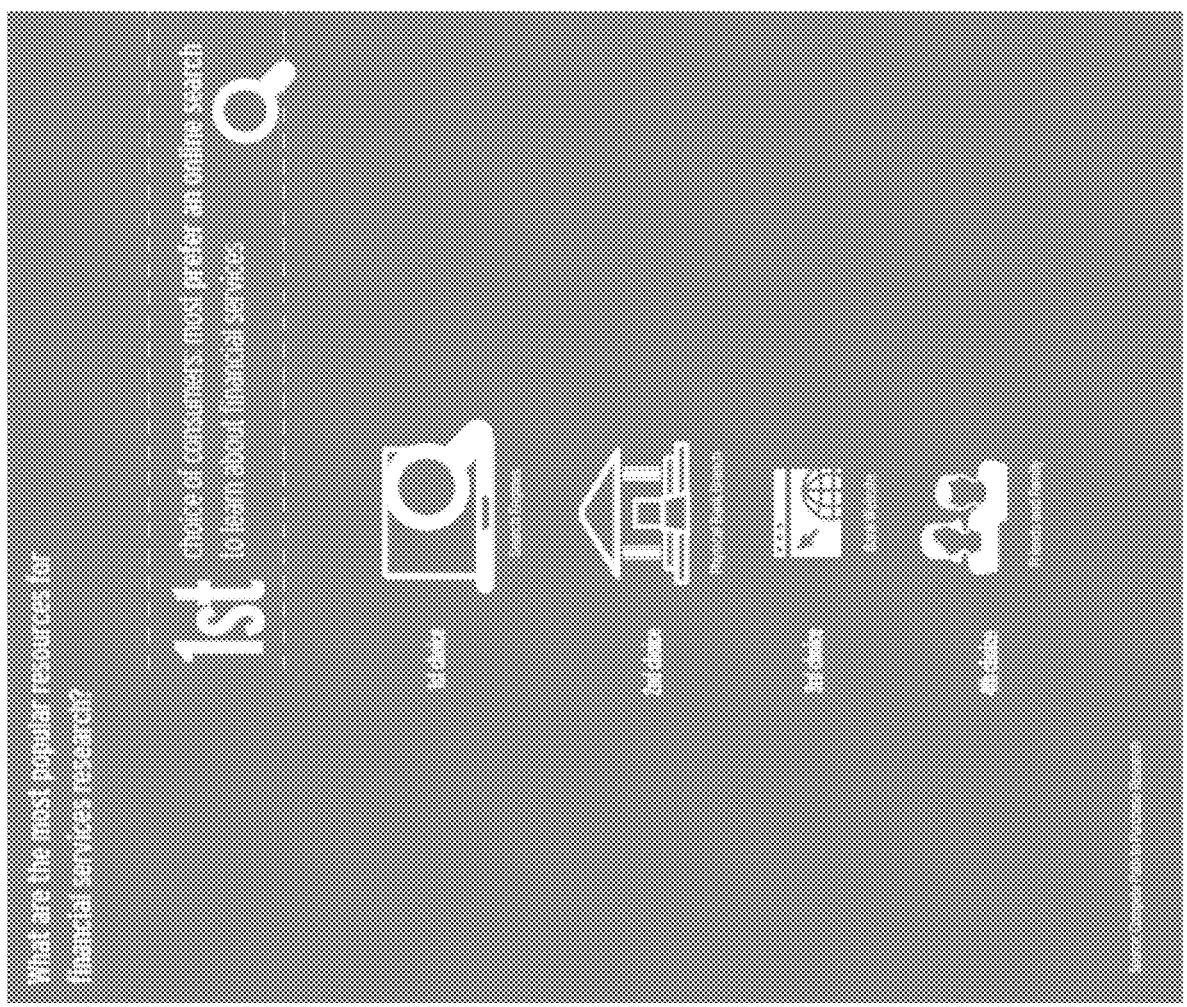
FIG. 29 depicts data 2900 on resources for financial services research.

Online banking consumers move quickly from research to selection, in most cases conducting research online and converting offline. Within the financial services category, digital impacts not only the consumer's path to purchase, but also their post-purchase service experience. Mobile features have a strong positive influence on consumer preference of financial institutions. Consumer must-haves revolve around the need to see product information quickly, explaining why they go online. To illustrate the speed of this selection, the digital touch-points facility's analysis found that 80 percent of customers have decided on a brand after their first research step, even before visiting a brand website. In contrast to other verticals, financial services marketing success depends on effectively servicing long term clients as much as acquiring them. The good news for financial brands is that there is a significant digital opportunity to engage shoppers across their full consumer journey; customers demonstrate a need for service post-purchase and prefer to do that online. Once a consumer establishes a brand preference, 64 percent of consumers complete an application, and there is a 30 percent increase in consumers engaging with the brand online for customer service. Referring to FIG. 29, through all phases of the path to purchase, even post-conversion, consumers consult search engines, bank-owned websites, and financial product comparison/review websites. Digital touch-points facility analysis also shows that there is a large mobile opportunity: financial brand favorability rises when companies have a mobile app that enables account holders to manage their money and account on-the-go. Across the consideration, selection, and recommendation phases of shopping, consumers were more likely to recommend institutions that offered a mobile app. Within the financial category, 29 percent of consumers were more likely to consider institutions with a mobile presence, 28 percent chose a brand with a mobile presence, and 27 percent recommended a brand with mobile presence. For brokerage firms, 27 percent were more likely to consider, 24 percent chose, and 18 percent recommended. For auto insurance companies, 23 percent were more likely to consider, 21 percent chose, and 20 percent recommended. In short, mobile yields a higher impact on consideration and retention rate. Additionally, a mobile presence is good news for advertising efforts as mobile shoppers are positively impacted by ads on finance-related apps. Financial services is a unique category in that the consumer journey toggles between online and offline, with each phase having distinct roles in attracting and servicing shoppers. Consumers need options, but for brand marketers, this should not be confused with too much available information—financial services selections have to be clear for better prospect retention. Knowing this, making product information quickly and clearly available on every channel is paramount. Companies can ensure product selection and information is clear and concise on bank-owned websites. Companies can invest in third party sites to complement brand sites. Companies can connect the online and offline user experience as consumers move quickly from online research to offline conversion. As review and comparison sites are key online research tools, they merit a place on a bank's homepage. Based on the digital touch-points facility's analysis, it is recommended to incorporate third-party financial reviews on bank websites to further contribute to shopping quality and ease. Esurance is making transparency a priority in their consumer experience, an example that can lead to valuable and usable review content. Schwab and Bank of America have also taken an approach similar to Apple, which allows customers to make an appointment online before physically visiting a branch location—another improvement to consumer experience and, consequently, reviews. The connection between online and offline is particularly clear for opening new accounts. In fact, for every one account opened online, digital touch-points facility analysis has found that eight accounts are opened at a physical location. Knowing this about the financial path to purchase, brands need to ensure that the transition between research and conversion is seamless. The messaging and theme of online collateral need to match the consumer experience when an informed prospect walks through a bank's door.

Now we turn to systems and methods for modeling single user behavior at a computer and applying the model to clickstreams from multi-user households to determine a number of users. In an embodiment, multiple user behavior at a single computer may be used to generate a model against which to analyze clickstreams from other computers for evidence of multiple users. To generate the model, session data from households with multiple users are collected. In embodiments, a session may be defined by a period of activity followed by and/or preceded by a period of inactivity. It is assumed that each session belongs to an individual user. Users of the computer may be asked if they are the primary user prior to the session commencing. Based on whether the user indicates that they are the primary users of the machine or not, the household is classified either as a single user household (where every session is associated with the primary user) or a multiple user household (where there are sessions associated with a primary user and one or more non-primary users). Single user household data are used to develop a model of single user activity by examining clickstream variables including time spent and page view data of the top 100 domains and time spent and page views on platform-defined categories of websites (e.g. sports lovers, film buffs, internet searchers, etc.). This model can be used with data from households that have primary and non-primary users to identify the number of individuals in multiple user households. Using various analytical techniques such as discriminant analysis and cluster analysis, the model can be used to cluster sessions within multiple user households. Based on the number of clusters, the number of users in a household may be estimated.

In some embodiments, an engagement index as described above measures the actual engagement a user may have with a touch-point along the path to purchase. Touch-points can include, but are not limited to, web sites (e.g., manufacturer web sites, retailer web sites, third party review web sites, online forums germane to the corresponding product or service, etc.), social media outlets (e.g., TWITTER, FACEBOOK, etc.), content (such as advertisements, offers, etc.) served via email, text message, in other applications, or the like. Actual engagement can include, but is not limited to, viewing particular content associated with the touch-point, interacting with the touch-point in a pre-determined manner, or the like.

In some implementations, an intensity of interaction is associated with particular manners of interacting with a touch point. For example, merely receiving an advertisement may be considered a relatively low intensity of interaction; clicking on a link in the advertisement may be considered a higher intensity of interaction; referencing the advertisement in a post written by the user in an online forum may be considered yet a higher degree of interaction, etc.

In implementations, the engagement index may be computed in any way. In some implementations, the engagement index may be computed as a total number of touch-points interacted with over a pre-determined time. In some implementations, the engagement index may be computed as an intensity-weighted function of touch-points that have been interacted with. In some implementations, the engagement index may be computed as a ratio of a number of pre-determined types of interactions (e.g., high degree interactions) vs. a number of total interactions, which may or may not be intensity-weighted.

In some embodiments, the influence index measures a probability of a touch-point influencing a final shopper action. The influence index can be computed in any way. In some implementations, the influence index can be computed using one or more probabilistic models, for example Bayesian models. In some implementations, the influence index can be computed based on a frequency with which a given touch-point is interacted with in a particular way, compared with the frequency of a pre-determined shopper outcome (e.g., a particular product category, brand, or model is purchased or not purchased in a given time frame, etc.).

In implementations, the opportunity index describes a relative performance of a brand. The performance may be measured with respect to any population of other brands, other products, other product categories, etc. The opportunity index may be computed in any way. In some implementations, the opportunity index is computed based on the influence indices of the various touch-points (or pre-determined subset of touch-points) that are associated with the brand.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

What is claimed is:

1. A method, comprising:
providing a data collection agent (DCA) that:
records web browser click events including uniform resource locator (URL) data across a plurality of web sites, and
transmits a click-stream of the web browser click events to a data collection server (DCS) that resides on a computer, the DCA embodied as a web browser plug-in on a user client station;
receiving the web browser click events from the DCA, as a clickstream, at the DCS;
recording and providing user online activity by:
reading a list of URL rules,
walking through URL characters of the URL data to determine one or more URL rules of the list of URL rules to apply to the URL data, and
applying the one or more URL rules to the URL data;
surveying a user to collect sales transaction data and preference data, the sales transaction data including offline behavior related to sales and the preference data indicating whether the user prefers visiting an offline store and/or a website to view a product prior to purchase;
filtering the user online activity to include activity from a time period prior to a sale from the sales transaction data, the sale associated with the product;
identifying, using a digital touch-points facility, one or more shopping touch-points based on the filtered user online activity, the sales transaction data, and the preference data;
determining a path to purchase of the user based on the one or more shopping touch-points;
identifying cross-shopping behavior for a competitive product of the product based on the filtered user online activity; and
modifying an online promotional process and an offline promotional process for the product and an offline promotional process for a second product complementary to the product, based on the path to purchase of the user and the cross-shopping behavior.

2. The method of claim 1, further comprising calculating an engagement index based on a percent of total shoppers interacting with a specific touch-point, and an intensity of those interactions, including time and number of repeat visits as determined from the user online activity, wherein the engagement index represents actual shopper engagement with the specific touch-point.

3. The method of claim 2, further comprising calculating an influence index, wherein the influence index represents a probability of the specific touch-point interaction influencing a shopper's final action.

4. The method of claim 1, further comprising calculating an opportunity index, wherein the opportunity index shows a competitive view of specific touch-point interactions.

5. The method of claim 1, wherein the click events occur on at least one of a computer, a tablet, and a mobile device.

6. The method of claim 1, wherein the sales transaction data include one or more of a date of transaction, a time of transaction, a method of payment, a type of good(s) or service(s) transacted, and a merchant.

7. A method, comprising:
surveying a user to collect sales transaction data and preference data, the sales transaction data including offline behavior related to sales and the preference data indicating whether the user prefers visiting an offline store and/or a website to view a product prior to purchase;
collecting web browser click events including uniform resource locator (URL) data across a plurality of web sites using a data collection agent (DCA), the DCA embodied as a web browser plug-in on a user client station;
transmitting a click-stream of the web browser click events to a data collection server (DCS) that resides on a computer;
recording and providing user online activity by:
reading a list of URL rules,
walking through URL characters of the URL data to determine one or more URL rules of the list of URL rules to apply to the URL data, and
applying the one or more URL rules to the URL data;
matching the sales transaction data to the user online activity;
filtering the user online activity to include activity from a time period prior to a sale from the sales transaction data, the sale associated with the product;
identifying, using a digital touch-points facility, one or more shopping touch-points based on the filtered user online activity, the sales transaction data, and the preference data;
determining a path to purchase of the user based on the one or more shopping touch-points;
identifying cross-shopping behavior for a competitive product of the product based on the filtered user online activity; and
modifying an online promotional process and an offline promotional process for the product and an offline promotional process for a second product complementary to the product, based on the path to purchase of the user and the cross-shopping behavior.

8. The method of claim 7, wherein the click events occur on at least one of a computer, a tablet, and a mobile device.

9. The method of claim 7, wherein the data are matched by at least one of address, name, phone number, email address, and credit card number.

10. The method of claim 7, further comprising calculating an engagement index based on a percent of total shoppers interacting with a specific touch-point, and an intensity of those interactions, including time and number of repeat visits as determined from the user online activity, wherein the engagement index represents actual shopper engagement with the specific touch-point.

11. The method of claim 10, further comprising calculating an influence index, wherein the influence index represents the probability of the specific touch-point interaction influencing a shopper's final action.

12. The method of claim 7, further comprising calculating an opportunity index, wherein the opportunity index shows a competitive view of specific touch-point interactions.

13. The method of claim 7, further comprising calculating at least one of an influence index, an opportunity index and an engagement index for a combination of touch-points.

14. The method of claim 7, further comprising calculating at least one of an influence index, an opportunity index and an engagement index for a path representing navigation among at least a plurality of touch-points.

15. The method of claim 7, wherein the sales transaction data include one or more of a date of transaction, a time of transaction, a method of payment, a type of good(s) or service(s) transacted, and a merchant.

16. The method of claim 1, further comprising modifying an online promotional process for the complementary second product.

17. The method of claim 1, wherein modifying the online and the offline promotional processes comprises generating an online dialogue between users and a provider of the product.

18. The method of claim 1, wherein modifying the online and the offline promotional processes comprises providing site tools that influence the path to purchase of the user at a shopping touch-point, the site tools comprising a research tool.

19. The method of claim 1, further comprising forecasting a demand for the product.

20. The method of claim 1, wherein recording and providing user online activity further includes:
   sessionizing the URL data for a given user based on timestamps of the URL data,
   decomposing the URL data into constituent parts, and
   hashing the URL data to produce a unique hash identifier based on the constituent parts.

21. The method of claim 1, wherein the surveyed sales transaction data indicates whether the user purchased the product from a webpage or an offline store.

22. The method of claim 7, wherein the surveyed sales transaction data indicates whether the user purchased the product from a webpage or an offline store.

23. The method of claim 1, wherein the surveyed sales transaction data indicates offline research performed by the user prior to the sale.

24. The method of claim 7, wherein the surveyed sales transaction data indicates offline research performed by the user prior to the sale.

25. The method of claim 1, wherein the preference data indicates whether the user prefers to visit one or more websites prior to purchase.

26. The method of claim 7, wherein the preference data indicates whether the user prefers to visit one or more websites prior to purchase.

* * * * *